United States Patent
Seo et al.

(10) Patent No.: US 8,747,966 B2
(45) Date of Patent: Jun. 10, 2014

(54) OPTICAL ELEMENT

(71) Applicant: LG Chem, Ltd., Seoul (KR)

(72) Inventors: Eun Mi Seo, Daejeon (KR); Sin Young Kim, Daejeon (KR); Kyun Il Rah, Daejeon (KR); Moon Soo Park, Daejeon (KR); Seung Hun Chae, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/891,020

(22) Filed: May 9, 2013

(65) Prior Publication Data

US 2013/0250196 A1 Sep. 26, 2013

Related U.S. Application Data

(63) Continuation of application No. PCT/KR2011/008594, filed on Nov. 10, 2011.

(30) Foreign Application Priority Data

| Nov. 10, 2010 | (KR) | 10-2010-0111757 |
| Nov. 10, 2010 | (KR) | 10-2010-0111758 |
| Dec. 7, 2010 | (KR) | 10-2010-0124411 |
| Jun. 15, 2011 | (KR) | 10-2011-0057830 |
| Oct. 26, 2011 | (KR) | 10-2011-0110092 |
| Oct. 26, 2011 | (KR) | 10-2011-0110093 |
| Oct. 26, 2011 | (KR) | 10-2011-0110096 |
| Nov. 10, 2011 | (KR) | 10-2011-0117228 |

(51) Int. Cl.
- *G02B 27/22* (2006.01)
- *G02B 27/26* (2006.01)
- *G02B 27/28* (2006.01)
- *G02B 5/30* (2006.01)
- *C09K 19/38* (2006.01)
- *G02F 1/133* (2006.01)

(52) U.S. Cl.
USPC ............ 428/1.1; 428/1.3; 428/1.5; 428/1.51; 428/1.52; 428/1.53; 428/1.54; 428/1.55; 349/15; 349/122; 349/183; 349/193; 349/194; 252/299.01

(58) Field of Classification Search
USPC .............. 428/1.1, 1.5, 1.51, 1.52, 1.53, 1.54, 428/1.55; 252/299.01, 299.5, 299.67; 349/15, 96, 183, 122, 193, 194
See application file for complete search history.

(56) References Cited

U.S. PATENT DOCUMENTS

| 2012/0257128 A1* | 10/2012 | Seo et al. ............ 349/15 |
| 2012/0262639 A1* | 10/2012 | Kim et al. ............ 349/15 |
| 2013/0044286 A1* | 2/2013 | Yoon et al. ............ 349/194 |

FOREIGN PATENT DOCUMENTS

| JP | 09-005521 | 1/1997 |
| JP | 10-153707 | 6/1998 |
| JP | 2008-287207 | 11/2008 |
| KR | 10-2010-0034726 | 4/2010 |
| KR | 10-2010-0058462 | 6/2010 |

* cited by examiner

*Primary Examiner* — Shean C Wu

(74) *Attorney, Agent, or Firm* — McKenna Long & Aldridge, LLP

(57) ABSTRACT

An optical element and a stereoscopic image display device are provided. The optical element is a light-dividing element, for example an element that can divide incident light into at least two kinds of light having different polarized states. Therefore, the optical element can be used to realize a stereoscopic image.

21 Claims, 8 Drawing Sheets

Fig.3

| A | B | A | B | A | B |
|---|---|---|---|---|---|
| B | A | B | A | B | A |
| A | B | A | B | A | B |
| B | A | B | A | B | A |
| A | B | A | B | A | B |
| B | A | B | A | B | A |

Fig.12

| LG | RG | LG | RG | LG | RG |
|----|----|----|----|----|----|
| RG | LG | RG | LG | RG | LG |
| LG | RG | LG | RG | LG | RG |
| RG | LG | RG | LG | RG | LG |
| LG | RG | LG | RG | LG | RG |
| RG | LG | RG | LG | RG | LG |

OPTICAL ELEMENT

CROSS-REFERENCE TO RELATED APPLICATION

This application is a Continuation Bypass of International Application No. PCT/KR2011/008594, filed Nov. 10, 2011, and claims the benefit of Korean Application Nos. 10-2010-0111757 filed on Nov. 10, 2010, 10-2010-0111758 filed on Nov. 10, 2010, 10-2010-0124411, filed Dec. 7, 2010, 10-2011-0057830, filed Jun. 15, 2011, 10-2011-0110092, filed Oct. 26, 2011, 10-2011-0110093, filed Oct. 26, 2011, 10-2011-0110096, filed Oct. 26, 2011, and 10-2011-0117228, filed Nov. 10, 2011 all of which are hereby incorporated by reference in their entirety for all purposes as if fully set forth herein.

BACKGROUND

1. Field of the Invention

The present invention relates to an optical element and a stereoscopic image display device.

2. Discussion of Related Art

Techniques of dividing light into at least two kinds of light having different polarized states may be effectively used in various fields.

The light division techniques may be, for example, applied to manufacture of stereoscopic images. The stereoscopic images may be realized using binocular parallax. For example, when two 2-dimensional images are input into the human left and right eyes, respectively, the input information is transmitted and combined in the brain, which makes it possible for a human being to experience 3-dimensional (3D) senses of depth and reality. Therefore, the light division techniques may be used during this procedure.

Techniques of generating a stereoscopic image may be effectively used for 3D measurements, and also used in 3D TV, cameras or computer graphics.

SUMMARY OF THE INVENTION

The present invention is directed to providing an optical element and a stereoscopic image display device.

One aspect of the present invention provides an optical element. The optical element according to one exemplary embodiment includes a liquid crystal layer and a polarizer, and also may include a first adhesive layer attaching the polarizer and the liquid crystal layer. In addition, the optical element may include a second adhesive layer formed on one surface of the polarizer, for example one surface of the polarizer in a position opposite to the liquid crystal layer, and a pressure-sensitive adhesive layer formed on one surface of the second adhesive layer, for example, one surface of the second adhesive layer in a position opposite to the polarizer.

According to one exemplary embodiment, the term "optical element" may refer to all kinds of optical instruments, optical parts or optical devices, each of which exhibits one or more optically intended functions. According to one exemplary embodiment, the optical element may also mean an element having a sheet or film shape. For example, the optical element may be an element that divides incident light into two or more kinds of light having different polarized states. Such an element may be, for example, used to realize a stereoscopic image.

FIG. 1 is a schematic diagram showing an optical element 1, showing a structure of the optical element 1 in which a liquid crystal layer 11, a first adhesive layer 12, a polarizer 13, a second adhesive layer 14 and a pressure-sensitive adhesive layer 15 are sequentially formed. As shown in FIG. 1, according to one exemplary embodiment, the second adhesive layer may be directly attached to one surface of the polarizer 13 without using the other element. As such, the pressure-sensitive adhesive layer 15 may be directly attached to the second adhesive layer 14.

The liquid crystal layer may have a difference between in-plane refractive indexes in a slow axis direction and in-plane refractive indexes in a fast axis direction of 0.05 to 0.2, 0.07 to 0.2, 0.09 to 0.2 or 0.1 to 0.2. The in-plane refractive index in the slow axis direction may refer to a refractive index in a direction in which the maximum value of the refractive index is defined with respect to the plane of the liquid crystal layer, and the in-plane refractive index in the fast axis direction may refer to a refractive index in a direction in which the minimum value of the refractive index is defined with respect to the plane of the liquid crystal layer. In general, the fast axis and slow axis in an optically anisotropic liquid crystal layer are formed vertically to each other. The refractive indexes may be measured with respect to light at a wavelength of 550 nm or 589 nm.

The liquid crystal layer may also have a thickness of approximately 0.5 μm to 2.0 μm or approximately 0.5 μm to 1.5 μm.

The liquid crystal layer satisfying the relationship of the refractive indexes and having the thickness may express a phase retardation property suitable for use in applications. According to one exemplary embodiment, the liquid crystal layer satisfying the relationship of the refractive indexes and having the thickness may be suitable for use in an optical element for optical division.

In addition, the liquid crystal layer may satisfy the conditions of the following Equation 1.

$$X < 8\% \qquad \text{Equation 1}$$

In Equation 1, X represents a percentage of the absolute value of a variation in a phase difference value of the liquid crystal layer obtained when the optical element is kept at 80° C. for 100 hours or 250 hours, relative to the initial phase difference value of the liquid crystal layer.

For example, X may be calculated as follows: $100 \times (|R_0 - R_1|)/R_0$. Here, $R_0$ is an initial phase difference value of the liquid crystal layer of the optical element, and $R_1$ represents a phase difference value of the liquid crystal layer obtained when the optical element is kept at 80° C. for 100 hours or 250 hours.

X may be preferably 7% or less, 6% or less or 5% or less. A variation of the phase difference value may be measured using a method presented in the following Examples.

A liquid crystal layer satisfying the above-described conditions may be, for example, embodied using the liquid crystal layer having the following compositions.

The liquid crystal layer may include a multifunctional polymerizable liquid crystal compound and a monofunctional polymerizable liquid crystal compound in polymerized forms.

In this specification, the term "multifunctional polymerizable liquid crystal compound" may refer to a compound that shows a liquid crystalline property because it includes a mesogen backbone, and also having two or more polymerizable functional groups. According to one exemplary embodiment, the multifunctional polymerizable liquid crystal compound may contain 2 to 10, 2 to 8, 2 to 6, 2 to 5, 2 to 4, 2 to 3, or 2 polymerizable functional groups.

In this specification, the term "monofunctional polymerizable liquid crystal compound" may also refer to a compound that shows a liquid crystalline property because it includes a mesogen backbone, and also having one polymerizable functional group.

Also, in this specification, the expression "a polymerizable liquid crystal compound being included in a liquid crystal layer in a polymerized form" may refer to a state in which the liquid crystal compound is polymerized to form a liquid crystal polymer in the liquid crystal layer.

When the liquid crystal layer includes the multifunctional and monofunctional polymerizable compounds in polymerized forms, the liquid crystal layer may have more excellent phase retardation properties, and the realized phase retardation properties, for example, the optical axis and a phase retardation value of the liquid crystal layer, may be stably maintained under the severe conditions.

According to one exemplary embodiment, the polymerizable liquid crystal compound may be a compound represented by the following Formula 1.

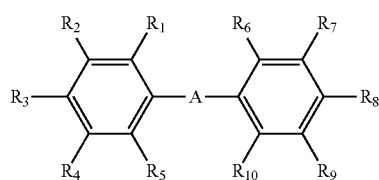

Formula 1

In Formula 1, A is a single bond, —COO— or —OCO—, and $R_1$ to $R_{10}$ are independently hydrogen, a halogen, an alkyl group, an alkoxy group, an alkoxycarbonyl group, a cyano group, a nitro group, —O-Q-P or a substituent of the following Formula 2, respectively, provided that at least one of the substituents $R_1$ to $R_{10}$ is —O-Q-P or a substituent of the following Formula 2, or two adjacent substituents of $R_1$ to $R_5$ or two adjacent substituents of $R_6$ to $R_{10}$ are joined together to form a benzene ring substituted with —O-Q-P, wherein Q is an alkylene group or an alkylidene group, and P is a polymerizable functional group such as an alkenyl group, an epoxy group, a cyano group, a carboxyl group, an acryloyl group, a methacryloyl group, an acryloyloxy group or a methacryloyloxy group.

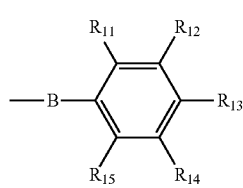

Formula 2

In Formula 2, B is a single bond, —COO— or —OCO—, and $R_{11}$ to $R_{15}$ are independently hydrogen, a halogen, an alkyl group, an alkoxy group, an alkoxycarbonyl group, a cyano group, a nitro group or —O-Q-P, respectively, provided that at least one of substituents $R_{11}$ to $R_{15}$ is —O-Q-P, or two adjacent substituents of $R_{11}$ to $R_{15}$ are joined together to form a benzene ring substituted with —O-Q-P. In Formula 2, Q is an alkylene group or an alkylidene group, and P is a polymerizable functional group such as an alkenyl group, an epoxy group, a cyano group, a carboxyl group, an acryloyl group, a methacryloyl group, an acryloyloxy group or a methacryloyloxy group.

In Formulas 1 and 2, the expression "two adjacent substituents are joined together to form a benzene ring substituted with —O-Q-P" may mean that the two adjacent substituents are joined together to form a naphthalene backbone substituted with —O-Q-P as a whole.

In Formula 2, "—" indicated on the left side of B may mean that B is directly bonded to the benzene ring of Formula 1.

In Formulas 1 and 2, the term "single bond" means that no additional atoms are present in a moiety represented by A or B. For example, when A in Formula 1 is a single bond, the benzene rings disposed on both sides of A may be directly bonded to form a biphenyl structure.

In Formulas 1 and 2, the halogen may be chlorine, bromine or iodine.

Unless otherwise defined in this specification, the term "alkyl group" may refer to a linear or branched alkyl group having 1 to 20 carbon atoms, 1 to 16 carbon atoms, 1 to 12 carbon atoms, 1 to 8 carbon atoms or 1 to 4 carbon atoms, or a cycloalkyl group having 3 to 20 carbon atoms, 3 to 16 carbon atoms or 4 to 12 carbon atoms. The alkyl group may be optionally substituted with one or more substituents.

Unless otherwise defined in this specification, the term "alkoxy group" may refer to an alkoxy group having 1 to 20 carbon atoms, 1 to 16 carbon atoms, 1 to 12 carbon atoms, 1 to 8 carbon atoms or 1 to 4 carbon atoms. The alkoxy group may be linear, branched or cyclic. Also, the alkoxy group may be optionally substituted with one or more substituents.

Also, unless otherwise defined in this specification, the term "alkylene group or alkylidene group" may refer to an alkylene group or alkylidene group having 1 to 12 carbon atoms, 4 to 10 carbon atoms or 6 to 9 carbon atoms. The alkylene group or alkylidene group may be linear, branched or cyclic. Also, the alkylene group or alkylidene group may be optionally substituted with one or more substituents.

Also, unless otherwise defined in this specification, the term "alkenyl group" may refer to an alkenyl group having 2 to 20 carbon atoms, 2 to 16 carbon atoms, 2 to 12 carbon atoms, 2 to 8 carbon atoms or 2 to 4 carbon atoms. The alkenyl group may be linear, branched or cyclic. Also, the alkenyl group may be optionally substituted with one or more substituents.

Also, in Formulas 1 and 2, P may be preferably an acryloyl group, a methacryloyl group, an acryloyloxy group or a methacryloyloxy group, more preferably an acryloyloxy group or a methacryloyloxy group, and most preferably an acryloyloxy group.

In this specification, the substituent which may be substituted with a certain functional group may be an alkyl group, an alkoxy group, an alkenyl group, an epoxy group, an oxo group, an oxetanyl group, a thiol group, a cyano group, a carboxyl group, an acryloyl group, a methacryloyl group, an acryloyloxy group, a methacryloyloxy group or an aryl group, but the present invention is not limited thereto.

The —O-Q-P which may be present in plural numbers in Formula 1 and 2 or the residue of Formula 2 may be, for example, present in a position of $R_3$, $R_8$ or $R_{13}$. Preferably, $R_3$ and $R_4$, or $R_{12}$ and $R_{13}$ may be joined together to form a benzene ring substituted with —O-Q-P. Also, in the compound of Formula 1 or the residue of Formula 2, the substituent except for the —O-Q-P or the residue of Formula 2, or the substituent except for those being joined together to form the benzene ring may be, for example, hydrogen, a halogen, a linear or branched alkyl group having 1 to 4 carbon atoms, an alkoxycarbonyl group containing a linear or branched alkoxy group having 1 to 4 carbon atoms, a cycloalkyl group having 4 to 12 carbon atoms, a cyano group, an alkoxy group having 1 to 4 carbon atoms, or a nitro group, and preferably chlorine, a linear or branched alkyl group having 1 to 4 carbon atoms, a cycloalkyl group having 4 to 12 carbon atoms, an alkoxy group having 1 to 4 carbon atoms, an alkoxycarbonyl group containing a linear or branched alkoxy group having 1 to 4 carbon atoms, or a cyano group.

The liquid crystal layer may include the monofunctional polymerizable liquid crystal compound in an amount of greater than 0 parts by weight and less than 100 parts by weight, 1 part by weight to 90 parts by weight, 1 part by weight to 80 parts by weight, 1 part by weight to 70 parts by weight, 1 part by weight to 60 parts by weight, 1 part by weight to 50 parts by weight, 1 part by weight to 30 parts by weight or 1 part by weight to 20 parts by weight, relative to 100 parts by weight of the multifunctional polymerizable liquid crystal compound.

The mixing effect of the multifunctional and monofunctional polymerizable liquid crystal compounds may be maximized within this range. Also, the liquid crystal layer may exhibit an excellent adhesive property to the adhesive layer. Unless otherwise defined in this specification, the term "unit part by weight" may mean a weight ratio.

The multifunctional and monofunctional polymerizable liquid crystal compound may be polymerized in a horizontally aligned state. In this specification, the term "horizontal alignment" may mean that the optical axis of a liquid crystal layer including a polymerized liquid crystal compound has an inclination angle of approximately 0° to approximately 25°, approximately 0° to approximately 15°, approximately 0° to approximately 10°, approximately 0° to approximately 5°, or approximately 0° with respect to a plane of the liquid crystal layer. In this specification, the term "optical axis" may refer to a fast axis or slow axis formed when incident light penetrates through a corresponding region.

According to one exemplary embodiment, the optical element may be an element that divides incident light into two or more kinds of light having different polarized states. Such an element may be, for example, used to realize a stereoscopic image.

For this purpose, the liquid crystal layer may include, for example, first and second regions having different phase retardation properties. In this specification, the fact that the first and second regions have the different phase retardation properties may include a case in which the first and second regions have optical axes formed in the same or different directions and also have different phase retardation values in a state where both of the first and second regions have the phase retardation properties, and a case in which the first and second regions have optical axes formed in different directions while having the same phase retardation value. According to another exemplary embodiment, the fact that the first and second regions have the different phase retardation properties may include a case in which one of the first and second regions has a phase retardation property, and the other region is an optically isotropic region having no phase retardation property. In this case, for example, the liquid crystal layer may be formed so that it can include both of a region including a liquid crystal layer and a region free of the liquid crystal layer. The phase retardation property of the first or second region may be regulated, for example, by controlling an alignment state of the liquid crystal compound, the refractive index relationship of the liquid crystal layer or a thickness of the liquid crystal layer.

According to one exemplary embodiment, the first region A and the second region B may be formed in stripe shapes extending to the same direction and alternately arranged adjacent to each other, as shown in FIG. 2, or they may be formed in a lattice pattern and alternately arranged adjacent to each other, as shown in FIG. 3.

When the optical element is used to display a stereoscopic image, one of the first and second regions may refer to a region configured to control polarization of an image signal for the left eye (hereinafter referred to as "LC region"), and the other region may refer to a region configured to control polarization of an image signal for the right eye (hereinafter referred to as "RC region").

According to one exemplary embodiment, the two or more kinds of light having the different polarized states, which are divided by the liquid crystal layer including the first and second regions, may include two kinds of linearly polarized light having vertical directions substantially to each other, or include left-circularly polarized light and right-circularly polarized light.

Unless otherwise defined in this specification, when terms such as vertical, horizontal, perpendicular or parallel are used in definitions of angles, the terms refer to an angle being substantially vertical, horizontal, perpendicular or parallel. For example, the terms include errors in consideration of manufacturing errors or variations. Therefore, the terms may, for example, include an error of not more than approximately ±15°, preferably an error of not more than approximately ±10°, and most preferably an error of not more than approximately ±5°.

According to one exemplary embodiment, one of the first and second regions may be a region through which incident light penetrates without rotating the polarization axis of the incident light, and the other region may be a region through which incident light penetrates while the polarization axis of the incident light is rotated in a direction perpendicular to the polarization axis of the incident light which penetrates through the one of the first and second regions. In this case, the regions of the liquid crystal layer including the polymerizable liquid crystal compound in a polymerized form may be formed on only one of the first and second regions. As such, the regions in which the liquid crystal layer is not formed may be empty, or may be a region in which a glass or optically isotropic resin layer, resin film or sheet is formed.

According to another exemplary embodiment, one of the first and second regions may be a region through which incident light can penetrate when the incident light is converted into left-circularly polarized light, and the other region may be a region through which incident light can penetrate when the incident light is converted into right-circularly polarized light. In this case, the first and second regions have optical axes formed in different directions while having the same phase retardation value, or one of the first and second regions may be a region in which incident light may be phase-retarded by ¼ of a wavelength of the incident light, and the other region may be a region in which incident light may be phase-retarded by ¾ of a wavelength of the incident light.

According to one exemplary embodiment, the first and second regions may have the same phase retardation value, for example, a value required to phase-retard incident light by ¼ of the wavelength of the incident light, and also have optical axes formed in different directions. As such, the optical axes formed in the different directions may be, for example, at right angles.

When the first and second regions have the optical axes formed in different directions, a line bisecting an angle formed between the optical axes of the first and the second regions is preferably formed so that the line can be vertical or horizontal with respect to the absorption axis of the polarizer.

FIG. 4 is a schematic diagram explaining the arrangement of the optical axes of the first and second regions when the first and second regions A and B shown in FIG. 2 or 3 have optical axes formed in different directions. Referring to FIG. 4, a line bisecting an angle formed between the optical axes of the first and second regions A and B may refer to a line bisecting an angle of $(\Theta1+\Theta2)$. For example, when $\Theta1$ and $\Theta2$ are the same angle, the angle-bisecting line may be formed in a direction horizontal with respect to a boundary line L between the first and second regions A and B. As such, an angle, namely $(\Theta1+\Theta2)$, formed between the optical axes of the first and second regions A and B may also be, for example, 90°.

In the optical element, the liquid crystal layer is attached to the polarizer by means of a first adhesive. The first adhesive layer may have a glass transition temperature of 85° C. or higher or 87° C. or higher. An optical element having excellent durability may be provided by attaching the polarizer to the liquid crystal layer using the adhesive layer having the glass transition temperature. Also, the first adhesive layer may serve to stably maintain a phase retardation property of the liquid crystal layer. Also, an upper limit of the glass transition temperature is not particularly limited, but may be, for example, in a range of approximately 200° C., approximately 150° C., or approximately 120° C.

In addition, the first adhesive layer may have a thickness of 6 μm or less, 5 μm or less or 4 μm or less. An adhesive property to the liquid crystal layer and a durability of phase retardation property of the liquid crystal layer, may be suitably maintained within this thickness. As such, a lower limit of the thickness of the first adhesive layer may be, for example, 0.1 μm, 0.3 μm or 0.5 μm.

The first adhesive layer may include an active energy ray-curable adhesive composition including a cationically polymerizable compound in a cured state. In this specification, the term "curing" may refer to a process for the composition to express an adhesive property or pressure-sensitive adhesivity through a physical or chemical action or reaction of a component included in a composition. As such, the term "active energy ray-curable composition" may also refer to a kind of a composition whose curing is induced by irradiation with active energy rays. As such, the "active energy rays" may include particle beams such as alpha-particle beams, proton beams, neutron beams or electron beams, as well as microwaves, infrared rays (IR), ultraviolet rays (UV), X rays and gamma rays. In general, the UV rays or electron beams may be used herein.

The adhesive composition may include a cationically polymerizable compound. Therefore, the adhesive composition may be, for example, an adhesive composition cured by a cationic polymerization reaction caused by irradiation with active energy rays.

Examples of the cationically polymerizable compound may include a cationically polymerizable epoxy compound, a vinyl ether compound, an oxetane compound, an oxolane compound, a cyclic acetal compound, a cyclic lactone compound, a thiirane compound, a thiovinylether compound, a spirotho ester compound, an ethylenic unsaturated compound, a cyclic ether compound or a cyclic thioether compound. Preferably, a cationically polymerizable epoxy compound may be used herein.

Examples of the cationically polymerizable epoxy compound may include an alicyclic epoxy compound, an aromatic epoxy compound or an aliphatic epoxy compound, which may be used alone or in combination. According to one exemplary embodiment, the cationically polymerizable compound may include both of the alicyclic epoxy compound and the aliphatic epoxy compound.

The term "alicyclic epoxy compound" may refer to a compound containing at least one alicyclic epoxy group. In this specification, the term "alicyclic epoxy group" refers to a functional group having an aliphatic saturated hydrocarbon ring, wherein two carbon atoms constituting the hydrocarbon ring also constitute an epoxy group.

Examples of the alicyclic epoxy compound may include an epoxycyclohexylmethyl epoxycyclohexanecarboxylate-based compound; an epoxycyclohexane carboxylate-based compound of alkanediol; an epoxy cyclohexylmethyl ester-based compound of dicarboxylic acid; an epoxycyclohexylmethyl ether-based compound of polyethylene glycol; an epoxycyclohexylmethyl ether-based compound of alkanediol; a diepoxytrispiro-based compound; a diepoxymonospiro-based compound; a vinylcyclohexene diepoxide compound; an epoxycyclopentyl ether compound; or a diepoxy tricyclo decane compound. Examples of the compounds may include compounds represented by the following Formulas 3 to 12, respectively.

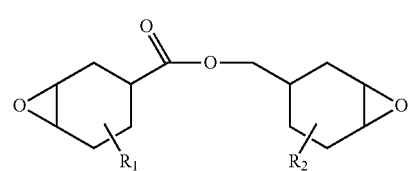

Formula 3

In Formula 3, $R_1$ and $R_2$ independently represent hydrogen or an alkyl group, respectively.

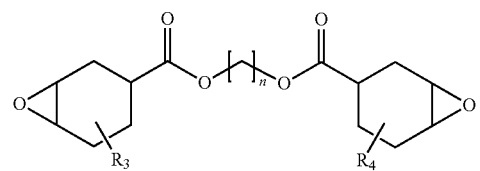

Formula 4

In Formula 4, $R_3$ and $R_4$ independently represent hydrogen or an alkyl group, respectively, and n represents an integer ranging from 1 to 20.

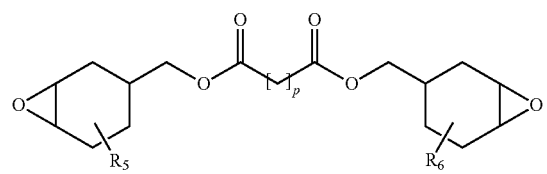

Formula 5

In Formula 5, $R_5$ and $R_6$ independently represent hydrogen or an alkyl group, respectively, and p represents an integer ranging from 1 to 20.

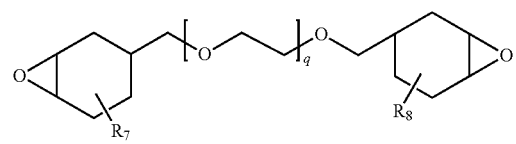

Formula 6

In Formula 6, $R_7$ and $R_8$ independently represent hydrogen or an alkyl group, respectively, and q represents an integer ranging from 1 to 20.

Formula 7

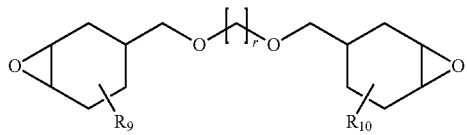

In Formula 7, $R_9$ and $R_{10}$ independently represent hydrogen or an alkyl group, respectively, and r represents an integer ranging from 1 to 20.

Formula 8

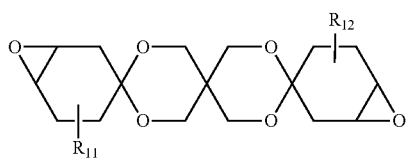

In Formula 8, $R_{11}$ and $R_{12}$ independently represent hydrogen or an alkyl group, respectively.

Formula 9

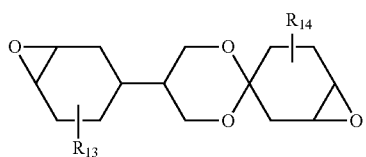

In Formula 9, $R_{13}$ and $R_{14}$ independently represent hydrogen or an alkyl group, respectively.

Formula 10

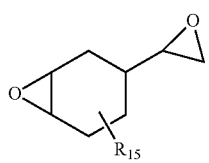

In Formula 10, $R_{15}$ represents hydrogen or an alkyl group.

Formula 11

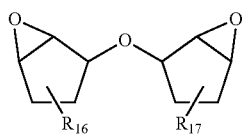

In Formula 11, $R_{16}$ and $R_{17}$ independently represent hydrogen or an alkyl group, respectively.

Formula 12

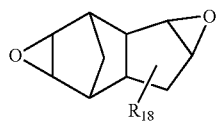

In Formula 12, $R_{18}$ represents hydrogen or an alkyl group.

Unless otherwise defined in this specification, the term "alkyl group" may refer to a linear, branched or cyclic substituted or unsubstituted alkyl group having 1 to 20 carbon atoms, 1 to 16 carbon atoms, 1 to 12 carbon atoms, 1 to 8 carbon atoms or 1 to 4 carbon atoms.

An epoxycyclohexylmethyl epoxycyclohexane carboxylate compound, an epoxycyclohexane carboxylate compound of alkanediol, an epoxycyclohexylmethyl ester compound of dicarboxylic acid or an epoxycyclohexylmethyl ether compound of alkanediol may be preferably used as the alicyclic epoxy compound. More particularly, the alicyclic epoxy compound that may be used herein may include at least one selected from the group consisting of an ester of 7-oxabicyclo[4,1,0]heptane-3-carboxylic acid and (7-oxa-bicyclo[4,1,0]hepto-3-yl)methanol (a compound in which $R_1$ and $R_2$ in Formula 3 are hydrogen); an ester of 4-methyl-7-oxabicyclo[4,1,0]heptane-3-carboxylic acid and (4-methyl-7-oxa-bicyclo[4,1,0]hepto-3-yl)methanol (a compound in which $R_1$ in Formula 3 is 4-$CH_3$ and $R_2$ is 4-$CH_3$); an ester of 7-oxabicyclo[4,1,0]heptane-3-carboxylic acid and 1,2-ethanediol (a compound in which $R_3$ and $R_4$ in Formula 4 are hydrogen and n is 1); an ester of (7-oxabicyclo[4,1,0]hepto-3-yl)methanol and adipic acid (a compound in which $R_5$ and $R_6$ in Formula 5 are hydrogen and p is 2); an ester of (4-methyl-7-oxabicyclo[4,1,0]hepto-3-yl)methanol and adipic acid (a compound in which $R_5$ and $R_6$ in Formula 5 are 4-$CH_3$ and p is 2); and an ether of (7-oxabicyclo[4,1,0]hepto-3-yl)methanol and 1,2-ethanediol (a compound in which $R_9$ and $R_{10}$ in Formula 7 are hydrogen and r is 1).

A difunctional epoxy compound, that is, a compound having two epoxy groups may be preferably used as the alicyclic epoxy compound, and a compound in which both of the two epoxy groups are alicyclic epoxy groups may be more preferably used, but the present invention is not limited thereto.

The aliphatic epoxy compound may be an epoxy compound having an aliphatic epoxy group rather than the alicyclic epoxy group. For example, examples of the aliphatic epoxy compound may include a polyglycidyl ether of aliphatic polyvalent alcohol; a polyglycidyl ether of an alkyleneoxide addition product of aliphatic polyvalent alcohol; a polyglycidyl ether of polyester polyol of aliphatic polyvalent alcohol and aliphatic polyvalent carboxylic acid; a polyglycidyl ether of aliphatic polyvalent carboxylic acid; a polyglycidyl ether of polyester polycarboxylic acid of aliphatic polyvalent alcohol and aliphatic polyvalent carboxylic acid; a dimer, oligomer or polymer obtained by vinyl polymerization of glycidyl acrylate or glycidyl methacrylate; or an oligomer or polymer obtained by vinyl polymerization of either glycidyl acrylate or glycidyl methacrylate; and a vinyl based monomer. Here, an aliphatic polyvalent alcohol or a polyglycidyl ether of an alkyleneoxide addition product of the aliphatic polyvalent alcohol may be preferably used herein, but the present invention is not limited thereto.

As such, the aliphatic polyvalent alcohol may, for example, be an aliphatic polyvalent alcohol having 2 to 20 carbon atoms, 2 to 16 carbon atoms, 2 to 12 carbon atoms, 2 to 8 carbon atoms or 2 to 4 carbon atoms. For example, examples of the aliphatic polyvalent alcohol may include an aliphatic diol such as ethyleneglycol, 1,2-propanediol, 1,3-propanediol, 2-methyl-1,3-propanediol, 2-butyl-2-ethyl-1,3-propanediol, 1,4-butanediol, neopentylglycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, or 1,10-decanediol; an alicyclic diol such as cyclohexanedimethanol, cyclohexanediol, hydrogenated bisphenol A, or hydrogenated bisphenol F; trimethylolethane, trimethylolpropane, a hexitol, a pentitol, glycerin, polyglycerin, pentaerythritol, dipentaerythritol, or tetramethylolpropane.

As such, the alkyleneoxide may also be an alkyleneoxide having 1 to 20 carbon atoms, 1 to 16 carbon atoms, 1 to 12 carbon atoms, 1 to 8 carbon atoms or 1 to 4 carbon atoms. For example, ethyleneoxide, propyleneoxide or butyleneoxide may be used herein.

As such, examples of the aliphatic polyvalent carboxylic acid may also include oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, 1,20-eicosamethylenedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 1,4-dicarboxylic acid methylenecyclohexane, 1,2,3-propanetricarboxylic acid, 1,2,3,4-butanetetracarboxylic acid, or 1,2,3,4-cyclobutanetetracarboxylic acid, but the present invention is not limited thereto.

A compound having no alicyclic epoxy group but containing at least three epoxy groups, preferably three epoxy groups, may be used as the aliphatic epoxy compound since the use of the compound is suitable in consideration of a curing property, weather resistance and refractive index characteristics, but the present invention is not limited thereto.

Examples of the aromatic epoxy compound that may be used herein may include an epoxy compound containing an aromatic group in the molecule, for example, a bisphenol-type epoxy resin such as bisphenol A epoxy, bisphenol F epoxy, bisphenol S epoxy or brominated bisphenol epoxy; a novolac-type epoxy resin such as phenol novolac-type epoxy resin or cresol novolac-type epoxy resin; a cresol epoxy resin or a resorcinol glycidyl ether.

The adhesive composition according to one exemplary embodiment may further include a silane compound having a cationically polymerizable functional group. The silane compound may be properly used to adjust a surface energy of an adhesive and improve adhesive strength, when necessary. For example, a compound represented by the following Formula 13 may be used as the silane compound.

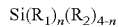  Formula 13

In Formula 13, $R_1$ is a cationically polymerizable functional group bonded to a silicon atom, $R_2$ is a functional group bonded to a silicon atom, for example, hydrogen, a hydroxyl group, an alkyl group or an alkoxy group, and n is an integer ranging from 1 to 4.

Examples of the cationically polymerizable functional group may include an alkenyl group such as a vinyl group, a cyclic ether group such as a glycidyl group or an oxetanyl group, a vinyloxy group, or a functional group including the cyclic ether group or the vinyloxy group.

Also, examples of the alkoxy group in Formula 13 may include an alkoxy group having 1 to 20 carbon atoms, 1 to 16 carbon atoms, 1 to 12 carbon atoms, 1 to 8 carbon atoms or 1 to 4 carbon atoms. The alkoxy group may be linear, branched or cyclic, or may be substituted or unsubstituted.

Also, n in Formula 13 may be preferably 1 or 2.

Examples of the compound of Formula 13 may include 2-(3,4-epoxycyclohexyl)ethyl trimethoxy silane, 3-glycidoxypropyl trimethoxy silane, glycidoxypropyl methyldiethoxy silane, glycidoxypropyl triethoxy, vinyltrimethoxysilane or vinyltriethoxysilane, but the present invention is not limited thereto.

An oligomer-type silane compound may also be used as the silane compound. Here, the oligomer-type silane compound may be obtained by introducing the above-described cationically polymerizable functional group into the molecule of a siloxane oligomer which is a relatively low molecular weight silicone resin in which the terminus of a molecular chain is blocked with an alkoxysilyl group.

The adhesive composition may include the silane compound in an amount of 0.1 parts by weight to 10 parts by weight, or 0.1 parts by weight to 5 parts by weight, relative to 100 parts by weight of the cationically polymerizable compound. The first adhesive layer may exhibit suitable surface energy and adhesive property within this content range. Unless otherwise defined in this specification, the unit "part(s) by weight" may mean a weight ratio of respective components.

The adhesive composition may further include a cationic initiator as a component for initiating a curing reaction. For example, a cationic photoinitiator, which releases a component capable of initiating cationic polymerization by irradiation with active energy rays, may be used as the cationic initiator.

The cationic photoinitiator that may be used herein may include an ionized cationic initiator such as onium salt or organometallic salt, or a non-ionized cationic photoinitiator such as organic silane or latent sulfonic acid or other non-ionized compounds. Examples of the onium salt-based initiator may include a diaryliodonium salt, a triarylsulfonium salt or an aryldiazonium salt, examples of the organometallic salt-based initiator may include iron arene, examples of the organic silane-based initiator may include o-nitrobenzyl triaryl silyl ether, triaryl silyl peroxide or acyl silane, and the latent sulfonic acid-based initiator may include α-sulfonyloxy ketone or α-(hydroxymethyl)benzoin sulfonate, but the present invention is not limited thereto. Also, a mixture of the iodine-based initiator and the photosensitizer may be used as the cationic initiator.

The ionized cationic photoinitiator is preferably used as the cationic initiator, the onium salt-based ionized cationic photoinitiator is more preferably used, and the triarylsulfonium salt-based ionized cationic photoinitiator is most preferably used, but the present invention is not limited thereto.

The adhesive composition may include a cationic initiator in an amount of 0.01 parts by weight to 20 parts by weight, 0.01 parts by weight to 10 parts by weight, or 0.01 parts by weight to 5 parts by weight, relative to 100 parts by weight of the cationically polymerizable compound, but this content may be varied in consideration of the curing efficiency.

The adhesive composition may further include a cationically polymerizable oxetane compound in addition to the epoxy compound, when necessary, in order to improve close adhesion after curing.

The oxetane monomer is a compound having a 4-membered cyclic ether group in a molecule structure. More particularly, examples of the oxetane monomer may include 3-ethyl-3-hydroxymethyl oxetane, 1,4-bis[(3-ethyl-3-oxetanyl)methoxymethyl]benzene, 3-ethyl-3-(phenoxymethyl) oxetane, di[(3-ethyl-3-oxetanyl)methyl]ether, 3-ethyl-3-(2-ethylhexyloxymethyl)oxetane or phenol novolac oxetane. For example, "ARON OXETANE OXT-101," "ARON OXETANE OXT-121," "ARON OXETANE OXT-211," "ARON OXETANE OXT-221" or "ARON OXETANE OXT-212" (commercially available from Toagosei Co., Ltd) may be used as the oxetane compound.

The adhesive composition may include the oxetane monomer in an amount of 10 parts by weight to 60 parts by weight or 20 parts by weight to 50 parts by weight, relative to 100 parts by weight of the cationically polymerizable compound. However, the content of the oxetane monomer may be varied in consideration of desired physical properties.

Also, the adhesive composition may further include a photosensitizer. Examples of the photosensitizer may include an anthracene compound, a pyrene compound, a carbonyl compound, an organic sulfur compound, a persulfide, a reduction-oxidation (redox) compound, an azo or diazo compound, a halogen compound or a photoreductive pigment. For example, the photosensitizer may be used in an amount of 10 parts by weight or less, relative to 100 parts by weight of the cationically polymerizable components included in the composition.

Examples of the photosensitizer may include an anthracene compound represented by the following Formula 14; pyrene; a benzoin derivative such as benzoin methyl ether, benzoin isopropyl ether or α,α-dimethoxy-α-phenylacetophenone; a benzophenone derivative such as benzophenone, 2,4-dichlorobenzophenone, o-benzoylbenzoic acid methyl, 4,4'-bis(dimethylamino)benzophenone or 4,4'-bis(diethylamino)benzophenone; a thioxanthone derivative such as 2-chlorothioxanthone or 2-isopropylthioxanthone; an anthraquinone derivative such as 2-chloroanthraquinone or 2-methylanthraquinone; an acridone derivative such as N-methylacridone or N-butylacridone; and optionally α,α-diethoxyacetophenone, benzyl, fluorenone, xanthone, a uranyl compound or a halogen compound.

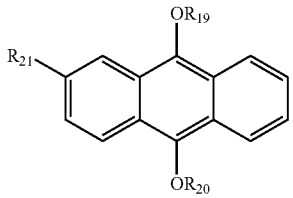

Formula 14

In Formula 14, $R_{19}$ and $R_{20}$ independently represent an alkyl group or an ether group, respectively, and $R_{21}$ represents hydrogen or an alkyl group.

In Formula 14, the alkyl group that may be used for $R_{19}$, $R_{20}$ and $R_{21}$ may include a methyl group, an ethyl group, a propyl group, an isopropyl group, a butyl group, an isobutyl group, an amyl group, an isoamyl group, a hexyl group, a 2-hexyl group, a 3-hexyl group, a cyclohexyl group, a 1-methylcyclohexyl group, a heptyl group, a 2-heptyl group, a 3-heptyl group, an isoheptyl group, an n-octyl group, an isooctyl group, a 2-ethylhexyl group, a nonyl group, an isononyl group, a decyl group, a dodecyl group, a tridecyl group, a tetradecyl group, a pentadecyl group, a hexadecyl group, a heptadecyl group or an octadecyl group.

Also, the ether group that may be used for $R_{19}$ and $R_{20}$ includes an ether group having 2 to 18 carbon atoms, for example, a 2-methoxyethyl group, a 2-ethoxyethyl group, a 2-butoxyethyl group, a 2-phenoxyethyl group, a 2-(2-methoxyethoxy)ethyl group, a 3-methoxypropyl group, a 3-butoxypropyl group, a 3-phenoxypropyl group, a 2-methoxy-1-methylethyl group, a 2-methoxy-2-methylethyl group. As seen from the above-described ether group, it is understood that the ether group in Formula 14 refers to a hydrocarbon group having one or more ether bonds and includes an alkoxyalkyl group, an alkoxyalkoxyalkyl group or an aryloxyalkyl group.

A compound in which $R_{19}$ and $R_{20}$ in Formula 14 are alkyl groups having 1 to 4 carbon atoms, and $R_{21}$ represents hydrogen or an alkyl group having 1 to 4 carbon atoms may be preferably used as the photosensitizer.

The photosensitizer may be used at a proper weight ratio in consideration of desired addition effects.

The first adhesive layer may be formed by curing the adhesive composition. For example, the adhesive composition may be cured by irradiation with active energy rays so that a polymerization reaction can be initiated. A light source used to irradiate active energy rays is not particularly limited, but a light source capable of irradiating active energy rays having an emission distribution at a wavelength of 400 nm or less is preferred. For example, the light source may include a low-pressure, medium-pressure, high-pressure or ultra high-pressure mercury lamp, a chemical lamp, a black light lamp, a microwave-excited mercury lamp or a metal halide lamp. The irradiation intensity of the active energy rays is determined according to components of the composition, but the present invention is not particularly limited thereto. Here, the irradiation intensity at a wavelength region in which the initiator is effectively activated is preferably in a range of 0.1 mW/cm$^2$ to 6,000 mW/cm$^2$. When the irradiation intensity is 0.1 mW/cm$^2$ or more, a reaction time is not too long, whereas, when the irradiation intensity is 6,000 mW/cm$^2$ or less, it is possible to prevent yellowing or degradation caused by heat radiated from the light source and heat generated during the curing of the composition. The irradiation time is adjusted according to a composition to be cured, but the present invention is not particularly limited thereto. In this case, the irradiation time is preferably set so that an integrated light intensity expressed as the product of the irradiation intensity and the irradiation time can be in a range of 10 mJ/cm$^2$ to 10,000 mJ/cm$^2$. When the integrated light intensity is 10 mJ/cm$^2$ or more, active species derived from the initiator may be maintained at a sufficient amount to securely carry out a curing reaction, whereas, when the integrated light intensity is 10,000 mJ/cm$^2$ or less, the irradiation time is not too long, thereby maintaining good productivity.

Also, the first adhesive layer has a gel fraction of 80% or more, 85% or more or 90% or more. The gel fraction of the first adhesive layer may be calculated from the following Equation 2.

$$\text{Gel fraction} = B/A \times 100 \qquad \text{Equation 2}$$

In Equation 2, A represents the mass of an adhesive, and B represents the dry mass of an insoluble fraction obtained after the adhesive having the mass A is precipitated into dimethylformamide at room temperature for 48 hours.

As such, room temperature may refer to a temperature that remains naturally unchanged without increasing or decreasing the temperature, for example, a temperature of approximately 10° C. to approximately 30° C., approximately 20° C. to 25° C., approximately 25° C. or approximately 23° C.

As such, the term "dry mass" of the insoluble fraction may also refer to the mass measured after an insoluble fraction precipitated into a solvent, ethyl acetate, is dried to remove the solvent included in the insoluble fraction. The drying conditions are not particularly limited, but may be selected to remove a solvent included in the insoluble fraction substantially completely.

The gel fraction of the first adhesive layer may be adjusted to properly maintain durability and adhesive property.

The optical element includes a polarizer attached to a liquid crystal layer by means of the first adhesive layer.

The kind of the polarizer included in the optical element is not particularly limited. For example, the kind of a conventional polarizer such as a polyvinyl alcohol polarizer, which is uniaxially or biaxially elongated and to which an iodine or dichroic dye is adsorbed and aligned, may be used as the polarizer. Examples of the polyvinyl alcohol resin of the polarizer may include a gelled polyvinylacetate resin. A homopolymer of a vinyl acetate or copolymer of a vinyl acetate and another comonomer may be used as the polyvinylacetate resin. Examples of the other comonomer may include an unsaturated carboxylic acid, an olefin, a vinylether, an unsaturated sulfonic acid and an acrylamide having an ammonium group. A gelling degree of the polyvinyl alcohol resin may be generally in a range of 85 mol % to 100 mol %, preferably 98 mol % or more. The polyvinyl alcohol resin may be further modified. For example, aldehyde-modified polyvinyl formal or polyvinylacetal may be used herein.

The optical element includes a second adhesive layer formed in a lower portion of the polarizer.

According to one exemplary embodiment, for example, the second adhesive layer has a thickness of 10 nm to 600 nm, 15 nm to 500 nm or 15 nm to 450 nm. When the thickness of the second adhesive layer is adjusted to a thickness of 10 nm or more, excellent water resistance of the optical element may be maintained, whereas, when the thickness of the second adhesive layer is adjusted to a thickness of 600 nm or less, it is possible to form a uniform adhesive layer.

The second adhesive layer may be used without particular limitation as long as it can be cured to exhibit desired adhesive characteristics. For example, the second adhesive layer may be formed by curing an adhesive composition used for the first adhesive layer, or a polyvinyl alcohol-based adhesive composition; an acryl adhesive composition; a vinyl acetate-based adhesive composition; a urethane-based adhesive composition; a polyester-based adhesive composition; a polyolefin-based adhesive composition; a polyvinylalkylether-based adhesive composition; a rubber-based adhesive composition; a vinyl chloride-vinylacetate-based adhesive composition; a styrene-butadiene-styrene (SBS) adhesive composition; a hydrogenated styrene-butadiene-styrene (SEBS)-based adhesive composition; an ethylene-based adhesive composition; and an acrylic ester-based adhesive composition. In addition to the compositions used for the first adhesive layer, the adhesive composition may be, for example, a water- or solvent-based or solvent-free adhesive composition. Also, the adhesive composition may be a thermocurable, room temperature-curable, moisture-curable or active energy ray-curable adhesive composition.

The optical element may include a pressure-sensitive adhesive layer formed in a lower portion of the second adhesive layer.

A conventional pressure-sensitive adhesive known in the field of optical elements, for example, an acryl pressure-sensitive adhesive, a silicon pressure-sensitive adhesive, an epoxy pressure-sensitive adhesive or a rubber-based pressure-sensitive adhesive may be used as the pressure-sensitive adhesive layer, but the present invention is not particularly limited thereto. According to one exemplary embodiment, an acryl pressure-sensitive adhesive may be used herein. The pressure-sensitive adhesive layer may be a pressure-sensitive adhesive layer used to attach the optical element to an optical instrument, for example, a liquid crystal panel of a liquid crystal display device or a display element of a stereoscopic image display device.

According to one exemplary embodiment, the pressure-sensitive adhesive layer may include a first main surface and a second main surface. Here, the first main surface may be attached to one side toward the second adhesive layer. The second main surface may be a pressure-sensitive adhesive surface for attaching the optical element to an optical instrument, for example, a liquid crystal panel of a liquid crystal display device or a display element of a stereoscopic image display device. The first main surface and the second main surface may be pressure-sensitive adhesive layers exhibiting different tensile modulus or having different peel strengths with respect to an alkali-free glass.

According to one exemplary embodiment, the first main surface attached to one side toward the polarizer may have a higher tensile modulus than the second main surface, or the first main surface may have a lower peel strength than the second main surface with respect to the alkali-free glass.

FIG. 5 schematically shows a pressure-sensitive adhesive layer 5 including a first main surface 51 and a second main surface 52.

According to one exemplary embodiment, the first main surface may have a tensile modulus at 25° C. of 1 MPa to 1,000 MPa, 10 MPa to 900 MPa or 250 MPa to 900 MPa. According to one exemplary embodiment, the second main surface may also have a tensile modulus at 25° C. of 0.01 MPa to 1.0 MPa, 0.02 MPa to 0.8 MPa or 0.03 MPa to 0.7 MPa. The tensile modulus may be measured according to the procedures prescribed in the ASTM D638 standard. According to another exemplary embodiment, the first main surface may have a peel strength with respect to an alkali-free glass of 5 gf/25 mm to 100 gf/25 mm, 5 gf/25 mm to 70 gf/25 mm, 10 gf/25 mm to 70 gf/25 mm, or 10 gf/25 mm to 50 gf/25 mm, and the second main surface may have a peel strength with respect to an alkali-free glass of 100 gf/25 mm to 1,000 gf/25 mm, 150 gf/25 mm to 800 gf/25 mm, 150 gf/25 mm to 70 gf/25 mm, or 250 gf/25 mm to 750 gf/25 mm. The peel strength is a value measured at room temperature at a peel rate of 300 mm/min and a peel angle of 180°.

The polarizer may show excellent wettability to various adherents while effectively suppressing shrinking and expansion of the polarizer under a high-temperature or high-humidity condition by controlling the physical properties of the first and second main surfaces within this range.

A method of forming the pressure-sensitive adhesive layer including both of the first and second main surfaces having different physical properties is not particularly limited. According to one exemplary embodiment, the pressure-sensitive adhesive layer may be a pressure-sensitive adhesive layer having a multilayer structure obtained by stacking at least two pressure-sensitive adhesive layers having different physical properties, or a pressure-sensitive adhesive layer having a single layer structure in which a gradient of a tensile modulus is formed in a thickness direction. The term "single layer" refers to a case where a pressure-sensitive adhesive layer is formed as only one pressure-sensitive adhesive layer. Therefore, the pressure-sensitive adhesive layer having a single layer structure excludes a pressure-sensitive adhesive layer having a structure in which at least two pressure-sensitive adhesive layers are stacked.

FIG. 6 is a pressure-sensitive adhesive layer 6 having a multilayer structure according to one exemplary embodiment, showing a structure of the pressure-sensitive adhesive layer 6 including a first pressure-sensitive adhesive layer 61 having a first main surface 51 formed therein; and a second pressure-sensitive adhesive layer 62 having a second main surface 52 formed therein. The pressure-sensitive adhesive layer may have a bilayer structure as shown in FIG. 6, and may be optionally formed in a multilayer structure with three or more layers. In this case, the pressure-sensitive adhesive layer may be generally formed in a bilayer structure in consideration of thin film formation.

According to another exemplary embodiment, the pressure-sensitive adhesive layer including both of the first and second main surfaces having different physical properties may be a single-layer pressure-sensitive adhesive layer having first and second main surfaces.

The pressure-sensitive adhesive layer having a single layer structure and including both of the first and second main surfaces having different physical properties may be, for example, prepared by forming a varying gradient in tensile modulus along a thickness direction of the pressure-sensitive adhesive layer. Referring to FIG. 7, a pressure-sensitive adhesive layer 7 has a gradient in tensile modulus formed along a thickness direction (a direction of arrow T in FIG. 7) from the first main surface 51 to the second main surface 52. The expression "tensile modulus being changed along a thickness direction" refers to a case where a tensile modulus of a pressure-sensitive adhesive layer continuously or intermittently increases or decreases in a thickness direction. More particularly, the tensile modulus may be changed in a thickness direction so that the first main surface 51 can have the highest tensile modulus and the second main surface 52 can have the lowest tensile modulus.

In order to change the tensile modulus of the pressure-sensitive adhesive layer in a thickness direction, for example, a method of controlling a curing degree of the pressure-sensitive adhesive layer differently to change in a thickness direction may be used. For example, when an active energy ray-curable pressure-sensitive adhesive composition as will be described later is used to form a pressure-sensitive adhesive layer, a pressure-sensitive adhesive layer having a varying elastic modulus in a thickness direction may be prepared by properly controlling a thickness of a coated pressure-sensitive adhesive composition and a light intensity of active energy rays illuminated during curing of the adhesive composition. That is, the illuminated active energy rays are lost or absorbed by reaction with a photoinitiator in a pressure-sensitive adhesive composition while penetrating through the pressure-sensitive adhesive composition in a thickness direction. When the light intensity of the active energy rays is adjusted in this manner, the light intensity of the active energy rays used to induce the curing reaction is weakened from an upper portion to a lower portion of the pressure-sensitive adhesive composition in a thickness direction, which makes it possible to control a curing degree to different extents in a thickness direction. Also, a pressure-sensitive adhesive layer having a varying curing degree in a thickness direction may be optionally obtained using a method of blending a proper amount of a UV absorbent with the pressure-sensitive adhesive composition. That is, the UV absorbent blended with the pressure-sensitive adhesive composition may absorb active energy rays applied to the composition during a curing process, and thus induce a variation in irradiation dose of the active energy rays in a thickness direction, thereby controlling a curing degree to different extents. When the tensile modulus is controlled to be changed in a thickness direction, the pressure-sensitive adhesive may have an average tensile modulus at 25° C. of 0.1 MPa to 500 MPa, 10 MPa to 400 MPa, 1 MPa to 300 MPa, or 45 MPa to 300 MPa. When the average tensile modulus is controlled within this range, the polarizing plate may serve to effectively suppress light leakage, and may show superior durability under a high-temperature or high-humidity condition.

For example, the pressure-sensitive adhesive layer may have a total thickness of approximately 10 $\mu$m to 80 $\mu$m, 20 $\mu$m to 60 $\mu$m, or 30 $\mu$m to 60 $\mu$m. When the pressure-sensitive adhesive layer has a multilayer structure as shown in FIG. 6, the first pressure-sensitive adhesive layer may have a thickness of 4 $\mu$m to 50 $\mu$m, and the second pressure-sensitive adhesive layer may have a thickness of 5 $\mu$m to 50 $\mu$m. When the thickness of the first pressure-sensitive adhesive layer is adjusted to a thickness of 4 $\mu$m or more and 50 $\mu$m or less, shrinking or expansion of the polarizer may be effectively prevented. Also, when the thickness of the second pressure-sensitive adhesive layer is adjusted to a thickness of 5 $\mu$m or more and 50 $\mu$m or less, the wettability of the pressure-sensitive adhesive layer or the durability of the optical element may be effectively maintained. Also, the thickness of the single-layer pressure-sensitive adhesive layer having a gradient in tensile modulus formed in a thickness direction may be, for example, controlled within a range of 20 $\mu$m to 80 $\mu$m, or 25 $\mu$m to 60 $\mu$m. When the thickness of the pressure-sensitive adhesive layer is less than 20 $\mu$m, the shrinking or expansion of the polarizer is insufficiently suppressed, or the pressure-sensitive adhesive layers having different curing degrees in a thickness direction may be poorly formed during the above-described curing process. When the thickness of the pressure-sensitive adhesive layer exceeds 80 $\mu$m, it is difficult o form a thin optical element.

The pressure-sensitive adhesive layers used respectively to form such pressure-sensitive adhesive layers having a multilayer structure and a single layer structure may be, for example, formed by curing a conventional room temperature-curable, moisture-curable, thermocurable or active energy ray-curable pressure-sensitive adhesive composition. As such, the curing of the pressure-sensitive adhesive composition refers to a state where pressure-sensitive adhesive characteristics of a pressure-sensitive adhesive composition are exhibited by a physical action or a chemical reaction by irradiating the pressure-sensitive adhesive composition with active energy rays, maintaining the pressure-sensitive adhesive composition at a predetermined temperature, or applying a proper amount of moisture to the pressure-sensitive adhesive composition.

Hereinafter, compositions of each pressure-sensitive adhesive layer used to form a pressure-sensitive adhesive layer will be described in detail.

According to one exemplary embodiment, the pressure-sensitive adhesive layer may be a pressure-sensitive adhesive including an interpenetrating polymer network (hereinafter also referred to as "IPN"). The term "IPN" may refer to a state where at least two cross-linking structures are present in a pressure-sensitive adhesive layer. According to one exemplary embodiment, the cross-linking structures may be present in a state of entanglement, linking or penetration. When the pressure-sensitive adhesive layer includes the IPN, the pressure-sensitive adhesive layer may show excellent durability under the severe conditions, and also may be used to realize a polarizing plate having excellent workability or optical property, or an excellent ability to prevent light leakage.

When the pressure-sensitive adhesive layer has an IPN structure, for example, the pressure-sensitive adhesive layer may include a cross-linking structure of an acrylic polymer cross-linked using a multifunctional cross-linking agent, and a cross-linking structure of a polymerized multifunctional acrylate.

As described above, for example, an acrylic polymer having a weight average molecular weight ($M_w$) of 500,000 or more before a cross-linking process may be used as the acrylic polymer cross-linked using the multifunctional cross-linking agent. In this specification, the weight average molecular weight is a value converted from that of a polystyrene standard as measured using gel permeation chromatography (GPC). Also, unless otherwise defined in this specification, the term "molecular weight" means a "weight average molecular weight." A polymer having a molecular weight of 500,000 or more may be used to form a pressure-sensitive adhesive layer having excellent durability under severe conditions. An upper limit of the molecular weight is not particularly limited, and the molecular weight of the acrylic polymer may be, for example, adjusted within 2,500,000 or less in consideration of the durability of a pressure-sensitive adhesive or a coating property of a composition.

According to one exemplary embodiment, the acrylic polymer may include a (meth)acrylic ester-based monomer and a cross-linking monomer as polymerization units, and preferably include 50 parts by weight to 99.9 parts by weight of a (meth)acrylic ester-based monomer and 0.1 parts by weight to 50 parts by weight of a cross-linking monomer in a polymerized form. As such, the term "cross-linking monomer" refers to a monomer that can copolymerize with the (meth)acrylic ester-based monomer, that is, to a monomer that can provide a cross-linking functional group to a side chain or terminus of a polymer after copolymerization. When a weight ratio of the monomer is adjusted within this range, the pressure-sensitive adhesive having excellent initial adhesive strength or durability may be provided.

For example, alkyl(meth)acrylate may be used as the (meth)acrylic ester-based monomer. That is, alkyl(meth)acrylate containing an alkyl group having 1 to 14 carbon atoms may be used in consideration of cohesion, glass transition temperature or pressure-sensitive adhesivity of a pressure-sensitive adhesive.

The cross-linking monomer may serve to adjust the durability, pressure-sensitive adhesive strength and cohesion of the pressure-sensitive adhesive, for example, to provide a nitrogen-containing functional group such as a hydroxyl group, a carboxyl group, an epoxy group, an isocyanate group or an amino group to a polymer. Also, a monomer copolymerizable with the (meth)acrylic ester-based monomer may be used as the cross-linking monomer. A variety of monomers playing such a role are known in the art, and all the monomers may be used in the present invention. Specific examples of the cross-linking monomer may include, but are not limited to, a hydroxyl group-containing monomer such as 2-hydroxyethyl (meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate or 2-hydroxypropyleneglycol(meth)acrylate; a carboxyl group-containing monomer such as (meth)acrylic acid, 2-(meth)acryloyloxy acetic acid, 3-(meth)acryloyloxy propyl acid, 4-(meth)acryloyloxy butyric acid, an acrylic acid dimer, itaconic acid, maleic acid and a maleic anhydride; or a nitrogen-containing monomer such as (meth)acrylamide, N-vinyl pyrrolidinone or N-vinyl caprolactam, which may be used alone or in combination.

In addition, the acrylic polymer may further include a monomer represented by the following Formula 15 in a polymerized form. Such a monomer may be effectively used to manufacture a pressure-sensitive adhesive layer having a varying tensile modulus in the above-described single layer structure.

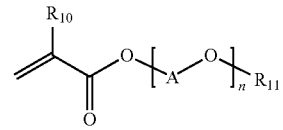

Formula 15

In Formula 15, $R_{10}$ represents hydrogen or an alkyl group, A represents an alkylene group or an alkylidene group, $R_{11}$ represents an alkyl group or an aryl group, and n represents an integer ranging from 1 to 50.

The monomer of Formula 15 serves to give an alkyleneoxide group to a polymer. According to one exemplary embodiment, the alkyleneoxide group may be linear, branched or cyclic alkyleneoxide having 1 to 20 carbon atoms, 1 to 16 carbon atoms, 1 to 12 carbon atoms, 1 to 8 carbon atoms or 1 to 4 carbon atoms.

Unless otherwise defined in this specification, the term "aryl group" may refer to a monovalent residue derived from a compound or a derivative thereof, which includes a benzene ring or has a structure in which two or more benzene rings are condensed or joined together. The aryl group may be, for example, an aryl group having 6 to 22 carbon atoms, preferably 6 to 16 carbon atoms, and more preferably 6 to 13 carbon atoms, such as a phenyl group, a phenylethyl group, a phenylpropyl group, a benzyl group, a tolyl group, a xylyl group or a naphthyl group.

Also, n in Formula 15 may be preferably in a range of 1 to 25, more preferably 1 to 15, and most preferably 1 to 6.

Specific examples of the monomer of Formula 15 may include alkoxy alkylene glycol(meth)acrylic ester, alkoxy dialkylene glycol(meth)acrylic ester, alkoxy trialkylene glycol(meth)acrylic ester, alkoxy tetraalkylene glycol(meth)acrylic ester, alkoxy polyethylene glycol(meth)acrylic ester, phenoxy alkylene glycol(meth)acrylic ester, phenoxy dialkylene glycol(meth)acrylic ester, phenoxy trialkylene glycol (meth)acrylic ester, phenoxy tetraalkylene glycol(meth)acrylic ester or phenoxy polyalkylene glycol(meth)acrylic ester. Here, the acrylic polymer may include at least one of the monomers.

When the acrylic polymer includes the monomer of Formula 15, for example, the acrylic polymer may include 40 parts by weight to 99.9 parts by weight of a (meth)acrylic ester monomer; 10 parts by weight to 50 parts by weight of a monomer of Formula 15; and 0.01 parts by weight to 30 parts by weight of a cross-linking monomer.

The acrylic polymer may be prepared by subjecting a mixture of monomers including the above-described components through a conventional polymerization method such as solution polymerization, photopolymerization, bulk polymerization, suspension polymerization or emulsion polymerization.

Examples of the multifunctional cross-linking agent serving to cross-link the above-described acrylic polymer in the pressure-sensitive adhesive layer may include conventional cross-linking agents such as an isocyanate cross-linking agent, an epoxy cross-linking agent, an aziridine cross-linking agent and a metal chelate cross-linking agent. The isocyanate cross-linking agent may be preferably used herein, but the present invention is not particularly limited thereto. Examples of the isocyanate cross-linking agent may include a multifunctional isocyanate compound such as tolylene diisocyanate, xylene diisocyanate, diphenylmethane diisocyanate, hexamethylene diisocyanate, isoboron diisocyanate, tetramethylxylene diisocyanate or naphthalene diisocyanate, or a compound obtained by reacting the multifunctional isocyanate compound with a polyol compound such as trimethylol propane. Examples of the epoxy cross-linking agent may include at least one selected from the group consisting of ethyleneglycol diglycidyl ether, triglycidyl ether, trimethylolpropane triglycidyl ether, N,N,N',N'-tetraglycidyl ethylenediamine and glycerin diglycidyl ether, examples of the aziridine cross-linking agent may include at least one selected from the group consisting of N,N'-toluene-2,4-bis(1-aziridine-carboxamide), N,N'-diphenylmethane-4,4'-bis(1-aziridine-carboxamide), triethylene melamine, bisisoprotaloyl-1-(2-methylaziridine) and tri-1-aziridinylphosphine oxide, but the present invention is not limited thereto. Also, examples of the metal chelate cross-linking agent may include compounds obtained by coordinating a polyvalent metal such as aluminum, iron, zinc, tin, titanium, antimony, magnesium and/or vanadium with acetylacetone or ethyl acetoacetate, but the present invention is not limited thereto.

The multifunctional cross-linking agent may be, for example, included in the pressure-sensitive adhesive layer in an amount of 0.01 parts by weight to 10 parts by weight, and more preferably 0.01 parts by weight to 5 parts by weight, relative to 100 parts by weight of the acrylic polymer. The cohesion or durability of a pressure-sensitive adhesive may be effectively maintained within this range.

For example, after the multifunctional cross-linking agent is included in the pressure-sensitive adhesive composition, the multifunctional cross-linking agent may serve to cross-link the acrylic polymer by reaction with a cross-linking functional group of the acrylic polymer during a process of forming a pressure-sensitive adhesive layer, such as an aging process.

The pressure-sensitive adhesive layer including the IPN structure may have a cross-linking structure formed from a polymerized multifunctional acrylate, as well as a cross-linking structure which is realized by the acrylic polymer cross-linked using the multifunctional cross-linking agent.

As long as compounds have at least two (meth)acryloyl groups, the compounds may be used as the multifunctional acrylate without limitation. For example, the multifunctional acrylate that may be used herein may include a difunctional acrylate such as 1,4-butanediol di(meth)acrylate, 1,6-hexanediol di(meth)acrylate, neopentylglycol di(meth)acrylate, polyethylene glycol di(meth)acrylate, neopentylglycol adipate di(meth)acrylate, hydroxyl puivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol(meth)acrylate, dimethylol dicyclopentane di(meth)acrylate, ethyleneoxide-modified hexahydrophthalic di(meth)acrylate, tricyclodecane dimethanol (meth)acrylate, neopentylglycol-modified trimethylpropane di(meth)acrylate, adamantane di(meth)acrylate or 9,9-bis[4-(2-acryloyloxyethoxy)phenyl]fluorene; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth) acrylate, propyleneoxide-modified trimethylolpropane tri (meth)acrylate, trifunctional urethane(meth)acrylate or tris (meth)acryloxyethylisocyanurate; a tetrafunctional acrylate such as diglycerin tetra(meth)acrylate or pentaerythritol tetra (meth)acrylate; a pentafunctional acrylate such as propionic acid-modified dipentaerythritol penta(meth)acrylate; and a hexafunctional acrylate such as dipentaerythritol hexa(meth) acrylate, caprolactone-modified dipentaerythritol hexa (meth)acrylate or urethane(meth)acrylate (for example, a reaction product of an isocyanate monomer and trimethylolpropane tri(meth)acrylate, etc.). When necessary, various kinds of urethane acrylate, polycarbonate acrylate, polyester acrylate, polyether acrylate or epoxy acrylate may be used as the compound known as the active energy ray-curable oligomer in the art. Such multifunctional acrylates may be used alone or in combination. When the multifunctional acrylate has a molecular weight of less than 1,000, a trifunctional or more functional acrylate may be preferably used to realize durability, but the present invention is not limited thereto.

An acrylate having a ring structure in the backbone structure may be preferably used as the multifunctional acrylate. Such an acrylate may be used to suppress shrinking and expansion of the polarizer more effectively and improve an ability to prevent light leakage. The ring structure present in the multifunctional acrylate may be any one of a carbocyclic structure or a heterocyclic structure; or a monocyclic or polycyclic structure. Examples of the multifunctional acrylate having a ring structure may include a monomer having an isocyanurate structure, such as tris(meth)acryloxy ethyl isocyanurate; and a hexafunctional acrylate such as isocyanate-modified urethane(meth)acrylate (i.e., a reaction product of an isocyanate monomer and trimethylolpropane tri(meth) acrylate)), but the present invention is not limited thereto.

The multifunctional acrylate in the pressure-sensitive adhesive layer may be included in an amount of 20 parts by weight to 200 parts by weight, relative to 100 parts by weight of the acrylic polymer. Therefore, it is possible to effectively adjust a tensile modulus of the pressure-sensitive adhesive layer and effectively maintain durability.

In addition, the pressure-sensitive adhesive layer may further include a silane coupling agent. The silane coupling agent may serve to enhance close adhesion and adhesive stability of the pressure-sensitive adhesive, and thus improve heat resistance and moisture resistance, and also to improve adhesion reliability even when the pressure-sensitive adhesive is kept for a long period time under the severe conditions. Kinds of conventional silane coupling agents known in the art may be used as the silane coupling agent.

As long as the pressure-sensitive adhesive layer does not affect the effects of the present invention, the pressure-sensitive adhesive layer may further include at least one additive selected from the group consisting of a pressure-sensitive adhesivity-providing resin, an epoxy resin, a curing agent, a UV stabilizer, an antioxidant, a toning agent, a reinforcing agent, a filler, an antifoaming agent, a surfactant and a plasticizer.

When the pressure-sensitive adhesive layer is formed using a thermocurable or room temperature-curable pressure-sensitive adhesive composition, the pressure-sensitive adhesive layer may include an acrylic polymer cross-linked using the multifunctional cross-linking agent.

Like the acrylic polymer used in the above-described active energy ray-curable composition, the acrylic polymer has a molecular weight of 500,000 to 2,500,000. For example, an acrylic polymer including a (meth)acrylic ester-based monomer and a cross-linking monomer as polymerization units, and more particularly an acrylic polymer including 80 parts by weight to 99.9 parts by weight of a (meth)acrylic ester-based monomer and 0.1 parts by weight to 20 parts by weight of a cross-linking monomer as polymerization units, may be used herein. The specific kinds of the (meth)acrylic ester-based monomer and the cross-linking monomer or a method of preparing the acrylic polymer are as described above.

Also, the above-described cross-linking agent such as an isocyanate cross-linking agent, an epoxy cross-linking agent, an aziridine cross-linking agent or a metal chelate cross-linking agent may be used as the multifunctional cross-linking agent to cross-link the acrylic polymer in the pressure-sensitive adhesive layer. In consideration of the tensile modulus, durability and cohesion of the pressure-sensitive adhesive layer, such a cross-linking agent may be included at a proper content, for example, a content of 0.01 parts by weight to 10 parts by weight, preferably 0.01 to 5 parts by weight, relative to 100 parts by weight of the acrylic polymer.

A method of forming such a pressure-sensitive adhesive layer is not particularly limited.

The pressure-sensitive adhesive layer may be formed by first blending components that may be used to form each pressure-sensitive adhesive layer, for example, the above-described acrylic polymer, the multifunctional cross-linking agent and the multifunctional acrylate, to prepare a pressure-sensitive adhesive composition, and then curing the adhesive composition under the suitable conditions.

For example, in order to form a pressure-sensitive adhesive layer having the IPN structure, a method of preparing a pressure-sensitive adhesive composition and coating and curing the adhesive composition may be used. Also, the curing of the pressure-sensitive adhesive composition may be, for example, carried out by sequentially or simultaneously performing a method of aging a pressure-sensitive adhesive composition at an appropriate temperature to perform a cross-linking reaction of an acrylic polymer and a multifunctional cross-linking agent and a method of irradiating a pressure-sensitive adhesive composition with electromagnetic waves to polymerize the multifunctional acrylate. As such, the irradiation with electromagnetic waves may be, for example, performed using a tool such as a high-pressure mercury lamp, an electrodeless lamp or a xenon lamp. Also, the irradiation conditions of the electromagnetic waves are not particularly limited as long as they are controlled to properly perform the polymerization of the multifunctional acrylate without causing damage to the general physical properties of the pressure-sensitive adhesive composition.

A photoinitiator may be further blended with the coated pressure-sensitive adhesive composition in consideration of the efficiency of a curing process by the irradiation with electromagnetic waves. The photoinitiator may be used without particular limitation as long as it can generate a radical by the irradiation with electromagnetic waves and initiate a curing reaction. For example, the photoinitiator may be properly selected from the kinds of the free radical photoinitiators described in the items regarding the above-described adhesive composition.

The photoinitiator may be included in an amount of 0.2 parts by weight to 20 parts by weight, preferably 0.2 parts by weight to 10 parts by weight, and more preferably 0.2 parts by weight to 5 parts by weight, relative to 100 parts by weight of the acrylic polymer. In addition, the photoinitiator may be included in an amount of 0.2 parts by weight to 20 parts by weight, relative to 100 parts by weight of the multifunctional acrylate. When the content of the photoinitiator is adjusted within this range, it is possible to effectively induce reaction of the multifunctional acrylate, and also prevent degradation of the physical properties of the pressure-sensitive adhesive caused by the components remaining after a curing process.

Meanwhile, a method of preparing a single-layer pressure-sensitive adhesive layer including first and second main surfaces having different physical properties according to one exemplary embodiment will be described as follows.

That is, the preparation method includes coating the pressure-sensitive adhesive composition, curing a coating layer by irradiating one surface of the coating layer with UV rays, thereby preparing a pressure-sensitive adhesive layer, and forming a gradient in tensile modulus of the cured pressure-sensitive adhesive layer in a thickness direction by absorbing the irradiated UV rays into the coating layer as the UV rays penetrate through the coating layer in a thickness direction.

As such, by a coating thickness of the pressure-sensitive adhesive composition and an irradiation intensity of the UV rays are controlled, or a UV absorbent is optionally blended with a composition as will be described later, the irradiated UV rays are absorbed into the coating layer while they penetrate through the coating layer in a thickness direction, thereby forming a gradient in elastic modulus.

FIG. 8 is a schematic diagram showing a method of preparing a pressure-sensitive adhesive layer according to one exemplary embodiment. As shown in FIG. 8, a pressure-sensitive adhesive layer may be formed by irradiating a coating layer 81 of the pressure-sensitive adhesive composition with active energy rays, for example, UV rays. In this case, a coating layer 81 of the pressure-sensitive adhesive composition is formed between two release films 82 and 83, and the irradiation with UV rays may be, for example, performed on one surface of the coating layer 81. The irradiated UV rays are absorbed into the coating layer 81 while they penetrate through the coating layer 81 in a thickness direction. Therefore, a first main surface 81 directly irradiated with the UV rays may have a high elastic modulus and low peel strength due to sufficient curing, but a second main surface 82 may have a low elastic modulus and high peel strength due to relatively insufficient curing.

In this case, the pressure-sensitive adhesive composition may further include a UV absorbent. Therefore, when one surface of the coating layer is irradiated with UV rays, the surface of the coating layer irradiated with the UV rays has a high elastic modulus due to sufficient curing. However, the UV rays are absorbed into the coating layer via the UV absorbent present in the coating layer as the UV rays penetrate through a lower portion of the coating layer in thickness direction. Therefore, a decreasing amount of the UV rays reach the coating layer in a thickness direction, starting from a surface of the coating layer irradiated with the UV rays, and a minimum amount of the UV rays reach the lowest portion of the coating layer, which is then cured to a minimum extent.

The UV absorbent may be used without particular limitation as long as it does not cause damage to the optical property, elastic modulus, repeelability, workability or peel strength of the pressure-sensitive adhesive layer.

The UV absorbent that may be used herein may include a benzotriazol compound such as a 2-(2'-hydroxyphenyl)-benzotriazol-based compound, for example, 2-(2'-hydroxy-5'-methylphenyl)benzotriazol, 2-(3',5'-di-tert-butyl-2'-hydroxyphenyl)benzotriazol, 2-(5'-tert-butyl-2'-hydroxyphenyl)benzotriazol, 2-(2-hydroxy-5-(1,1,3,3,tetramethylbutyl)phenyl)benzotriazol, 2-(3',5'-di-tert-butyl-2'-hydroxyphenyl)-5-benzotriazol, 2-(3'-tert-butyl-2'-hydroxyphenyl-5'-methylphenyl)-5-benzotriazol, 2-(3'-sec-butyl-5'-tert-butyl-2'-hydroxyphenyl)benzotriazol, 2-(2'-hydroxy-4'-octyloxyphenylphenyl)-5-benzotriazol or 2-(3',5'-di-tert-butyl-2'-hydroxyphenyl)benzotriazol; a benzophenone compound such as a 2-hydroxy benzophenone-based compound having a functional group such as 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy; a benzoic acid ester compound such as a compound having a substituted benzoic acid ester structure, for example, 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl-3,5'-di-tert-butyl-4-hydroxybenzoate, hexadecyl 3,5-di-tert-butyl-4-4-hydroxybenzoate, octadecyl 3,5-di-tert-butyl-4-hydroxybenzoate or 2-methyl-4,6-di-tert-butylphenyl 3,5-di-tert-butyl-4-hydroxybenzoate; or a triazine compound, but the present invention is not limited thereto.

In the pressure-sensitive adhesive composition, the UV absorbent may be included in an amount of 10 parts by weight or less, relative to 100 parts by weight of the acrylic polymer, or included in an amount of 0.1 parts by weight to 10 parts by weight, relative to 100 parts by weight of the multifunctional acrylate, but the present invention is not limited thereto. The content of the UV absorbent may be varied in consideration of curing conditions of a pressure-sensitive adhesive composition or desired physical properties such as elastic modulus or peel strength. However, when the content of the UV absorbent is extremely high, UV absorption of a coating solution is extremely increased, which makes it difficult to realize a pressure-sensitive adhesive layer having a varying elastic modulus in a thickness direction.

The irradiation with UV rays used to form the single-layer pressure-sensitive adhesive layer may be, for example, performed using a known tool such as a high-pressure mercury lamp, an electrodeless lamp or a xenon lamp. Also, the UV irradiation conditions are not particularly limited, but may be properly selected in consideration of the components of the pressure-sensitive adhesive composition. Therefore, a cured product having a varying tensile modulus in a thickness direction may be effectively prepared. In this case, an illuminance of a light source may be in a range of approximately 50 mW/cm$^2$ to 2,000 mW/cm$^2$, and a light intensity may be in a range of approximately 10 mJ/cm$^2$ to 1,000 mJ/cm$^2$, but the present invention is not limited thereto.

In the preparation method, an additional process such as heating, drying and aging may also be performed to improve curing efficiency of the pressure-sensitive adhesive composition and form an IPN structure, in addition to the process of irradiating active energy rays.

Also, when the adhesive composition is a room temperature-curable, moisture-curable or thermocurable adhesive composition, a method of forming a pressure-sensitive adhesive layer is similar to that described above, except that a curing process by irradiation with active energy rays is not performed. That is, a pressure-sensitive adhesive layer may be formed by suitably blending necessary components to prepare a pressure-sensitive adhesive composition, coating a proper base with the pressure-sensitive adhesive composition and curing the pressure-sensitive adhesive composition.

The pressure-sensitive adhesive layer having a multilayer structure may be formed by sequentially repeating coating and curing processes according to the type of a pressure-sensitive adhesive composition, or by laminating a separately prepared pressure-sensitive adhesive layer.

When the pressure-sensitive adhesive layer has a bi- or more multilayer structure, the pressure-sensitive adhesive layer having the multilayer structure may be formed using a suitable one of the above-described thermocurable, room temperature-curable, moisture-curable and active energy ray-curable adhesive compositions. In this case, the pressure-sensitive adhesive layer may be formed using same or different adhesive compositions.

According to one exemplary embodiment, the pressure-sensitive adhesive layer includes a first pressure-sensitive adhesive layer having a first main surface formed therein; and a second pressure-sensitive adhesive layer having a second main surface formed therein. Here, when the first main surface is attached to a polarizer, the first pressure-sensitive adhesive layer may have the IPN structure.

The optical element may further include a base layer formed on the liquid crystal layer in a position opposite to the first adhesive layer. The base layer may be a base layer formed on a liquid crystal layer. The base layer may have a single-layer or multilayer structure. When the optical element further includes the base layer, the liquid crystal layer may be attached to the polarizer by means of the adhesive. FIG. 9 is a schematic diagram of an optical element 9 further including a base layer 91.

For example, a glass base layer or a plastic base layer may be used as the base layer. Examples of the plastic base layer may include a sheet or film including a cellulose resin such as triacetyl cellulose (TAC) or diacetyl cellulose (DAC); a cyclo olefin polymer (COP) such as a norbornene derivative; an acryl resin such as poly(methyl methacrylate) (PMMA); polycarbonate (PC); a polyolefin such as polyethylene (PE) or polypropylene (PP); PVA; poly ether sulfone (PES); polyetheretherketone (PEEK); polyetherimide (PEI); polyethylene naphthalate (PEN); a polyester such as polyethylene terepthalate (PET); polyimide (PI); polysulfone (PSF); or a fluorine resin.

The base layer, for example, the plastic base layer, may have a lower refractive index than the liquid crystal layer. The refractive index of the base layer according to one exemplary embodiment is in a range of approximately 1.33 to approximately 1.53. When the base layer has a lower refractive index than the liquid crystal layer, it is, for example, profitable that it enhances brightness, prevents reflection and improves contrast characteristics.

The plastic base layer may be optically isotropic or anisotropic. As such, when the base layer is optically anisotropic, the optical axis of the base layer is preferably arranged so that the optical axis of the base layer can be vertical or horizontal with respect to the above-mentioned line bisecting an angle formed between the optical axes of the first region and the second region.

According to one exemplary embodiment, the base layer may include a UV protector or a UV ray absorbent. When the base layer includes the UV protector or absorbent, it is possible to prevent degradation of the liquid crystal layer caused by UV rays. Examples of the UV protector or absorbent may include an organic matter such as a salicylic acid ester compound, a benzophenone compound, an oxybenzophenone compound, a benzotriazol compound, a cyanoacrylate compound or a benzoate compound, or an inorganic matter such as zinc oxide or a nickel complex salt. The content of the UV protector or absorbent in the base layer is not particularly limited, and may be properly selected in consideration of desired effects. For example, in the manufacture of the plastic base layer, the UV protector or absorbent may be included in an amount of approximately 0.1% by weight to 25% by weight, relative to the weight ratio of the main material of the base layer.

A thickness of the base layer is not particularly limited, and may be properly regulated according to a desired purpose of use. The base layer may have a single-layer or multilayer structure.

The optical element according to one exemplary embodiment may further include an alignment layer disposed between the base layer and the liquid crystal layer. The alignment layer may serve to align a liquid crystal compound during formation of the optical element. As the alignment layer, a conventional alignment layer known in the art, for example, an optical alignment layer or a rubbing alignment layer may be used. The alignment layer has a certain configuration, and may optionally have an alignment property without using an alignment layer by directly rubbing or elongating the base layer.

Also, the present invention is directed to providing a method of preparing an optical element. The method of preparing an optical element according to one exemplary embodiment may include attaching one surface of a polarizer to the liquid crystal layer using the first adhesive, and sequentially forming a second adhesive layer and a pressure-sensitive adhesive layer on the other surface of the polarizer.

As such, the liquid crystal layer may, for example, be prepared by forming an alignment film on a base layer, forming a coating layer of a liquid crystal composition including the polymerizable liquid crystal compound on the alignment film and polymerizing the liquid crystal composition in an aligned state to form a liquid crystal layer.

The alignment film may be, for example, formed using a method of forming a polymer film such as polyimide on a base layer, performing a rubbing process or coating an optically aligned compound, and aligning the optically aligned compound by irradiation with linearly polarized light. Various methods of forming an alignment film are known in the art in consideration of desired alignment patterns, for example, patterns of the first and second regions.

The coating layer of the liquid crystal composition may be formed by coating a composition on the alignment film of the base layer using a known method. A liquid crystal layer may be formed by aligning a liquid crystal composition according to an alignment pattern of the alignment film disposed under the coating layer and then polymerizing the liquid crystal composition.

A method of attaching a liquid crystal layer to a polarizer is not particularly limited. For example, the liquid crystal layer may be attached to the polarizer using a method of coating the above-described adhesive composition on one surface of the liquid crystal layer or the polarizer, and contacting the liquid crystal layer and the polarizer by means of the coating layer and then curing the adhesive composition, or a method of contacting the liquid crystal layer and the polarizer through a dropping method using an adhesive composition and then curing the adhesive composition. As such, the curing of the adhesive composition may be, for example, performed by irradiating the adhesive composition with a proper light intensity of active energy rays in consideration of components in the adhesive composition.

Also, a method of forming a second adhesive layer on the other surface of the polarizer and further forming a pressure-sensitive adhesive layer is not particularly limited. For example, an adhesive layer may be formed by coating one surface of a polarizer with an adhesive composition and curing the adhesive composition, and a pressure-sensitive adhesive layer formed in the above-described method may be laminated.

In addition, the present invention is directed to providing a stereoscopic image display device. The stereoscopic image display device according to one exemplary embodiment may include the above-described optical element.

According to one exemplary embodiment, the display device may further include a display element that can generate an image signal for the left eye (hereinafter referred to as an "L signal") and an image signal for the right eye (hereinafter referred to as an "R signal"). The optical element may be arranged so that L and R signals generated on the display element can first penetrate through the polarizer and then enter the liquid crystal layer. According to another exemplary embodiment, the above-described first and second regions having different phase retardation properties are formed on the liquid crystal layer, and may be arranged so that the L signal can penetrate through one of the first and second regions and the R signal can penetrate through the other region. As such, the optical element may be arranged so that the R and L signals can first penetrate through the polarizer of the optical element and then enter each region of the liquid crystal layer when the R and L signals are emitted from the display element.

As long as the stereoscopic image display device includes the optical element as a light-dividing element, a variety of methods known in the art may be applied to manufacture of the stereoscopic image display device.

FIG. 10 is a schematic diagram of a device according to one exemplary embodiment, showing the device by which an observer can wear the polarized glasses and observe a stereoscopic image.

For example, the device 10 may sequentially include a light source 101, a polarizing plate 102, the display element 103 and the optical element 104, as shown in FIG. 10.

As such, a direct or edge backlight generally used for liquid crystal display devices (LCDs) may be, for example, used as the light source 101.

According to one exemplary embodiment, the display element 103 may be a transmissive liquid crystal display panel including a plurality of unit pixels which are arranged in a row and/or column direction. One or two or more pixels may be combined to form an image signal-generating region for the right eye for generating an R signal (hereinafter referred to as an "RG region") and an image signal-generating region for the left eye for generating an L signal (hereinafter referred to as an "LG region").

The RG and LG regions may be formed in stripe shapes extending in the same direction and alternately arranged adjacent to each other, as shown in FIG. 11, or they may be formed in a lattice pattern and alternately arranged adjacent to each other, as shown in FIG. 12. In the liquid crystal layer 1042 of the optical element 104, the first and second regions correspond to the LC and RC regions, respectively, and may be arranged in consideration of the arrangement of the RG and LG regions so that the R signal transmitted from the RG region can be incident to the RC region via the polarizer 1041 and the L signal can be incident to the LC region via the polarizer 1041.

For example, the display element 103 may be a liquid crystal panel including a first transparent substrate, a pixel electrode, a first alignment film, a liquid crystal layer, a second alignment film, a common electrode, a color filter and a second transparent substrate, which are arranged sequentially toward from the light source 101. The polarizing plate 102 may be attached to one side of the panel through which light is incident, that is, one side of the light source 101, and the optical element 104 may be attached to the other side of the panel, which is arranged opposite to the one side of the panel. A polarizer included in the polarizing plate 102 and a polarizer 1041 included in the optical element 104 may be, for example, arranged so that the absorption axes of the two polarizers can be formed at a predetermined angle, for example, at an angle of 90°. Therefore, the arrangement of the two polarizers may allow light emitted from the light source 101 to penetrate through the display element 103 or be intercepted by the display element 103.

In a driving state, unpolarized light may be emitted toward the polarizing plate 102 from the light source 101 of the display device 10. In the light incident to the polarizing plate 102, light having a polarization axis parallel to the light transmission axis of the polarizer of the polarizing plate 102 may penetrate through the polarizing plate 102 and be incident to the display element 103. Light incident to the display element 103 and penetrating through the RG region may be converted into an R signal, light penetrating through the LG region may be converted into an L signal, and the R and L signals may then be incident to the polarizer 1041 of the optical element 104.

In the light incident to the liquid crystal layer 1042 through the polarizer 1041, light penetrating through the LC region and light penetrating through the RC region are emitted, respectively, in a state where the two kinds of light have different polarized states. As described above, the R and L signals having different polarized states may enter the right and left eyes of an observer wearing the polarized glasses, respectively, and thus the observer may observe a stereoscopic image.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIGS. 2 and 3 are schematic diagrams showing the arrangement of first and second regions of a liquid crystal layer according to one exemplary embodiment.

FIGS. 11 and 12 are schematic diagrams showing the arrangement of RG and LG regions according to one exemplary embodiment.

DETAILED DESCRIPTION OF EXEMPLARY EMBODIMENTS

Figure 1:
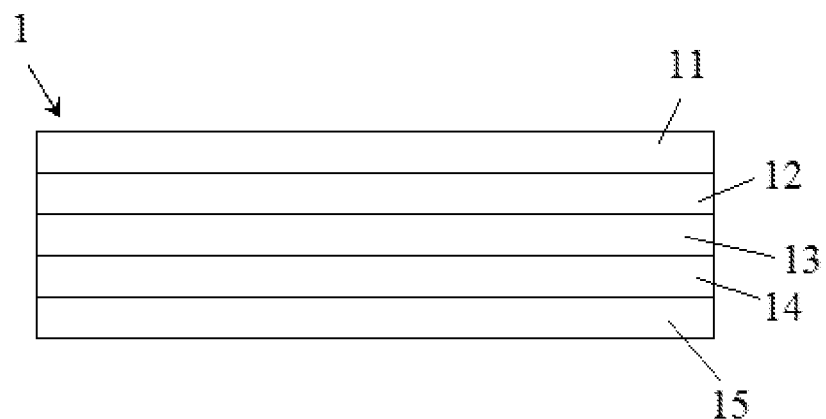
FIG. 1 is a schematic diagram showing an optical element according to one exemplary embodiment of the present invention.
Figure 2:
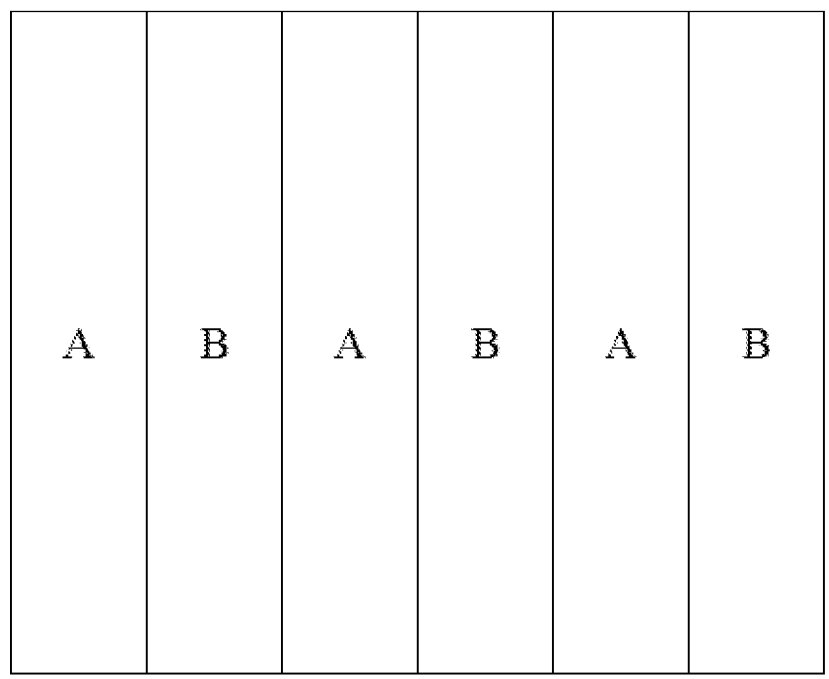
Figure 4:
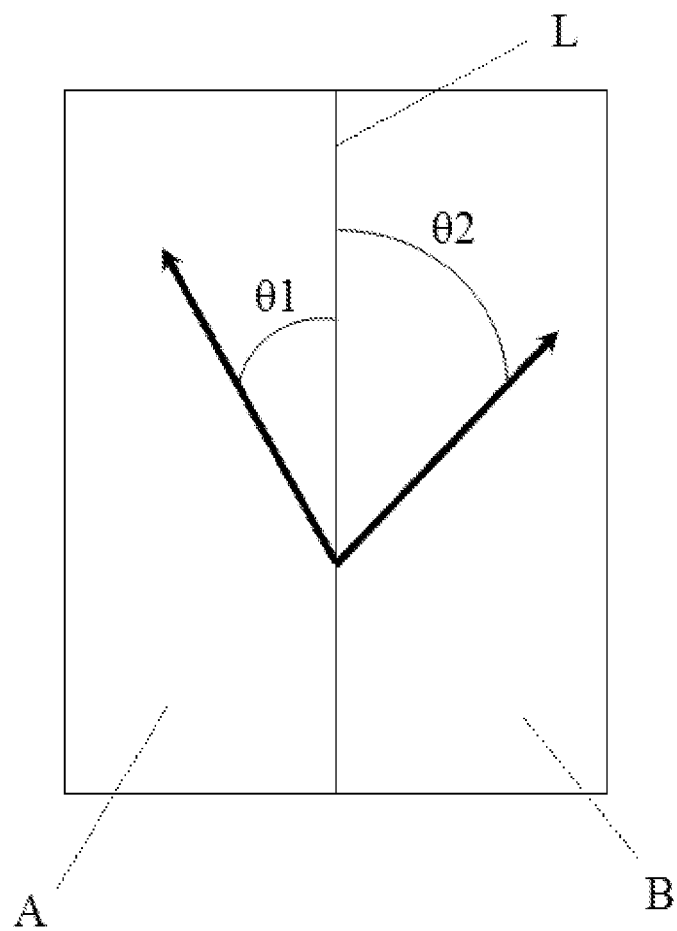
FIG. 4 is a schematic diagram showing the arrangement of optical axes of the first and second regions of the liquid crystal layer according to one exemplary embodiment.
Figure 5:
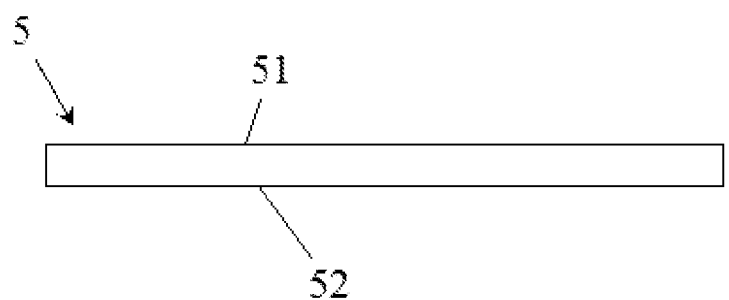
FIGS. 5 to 7 are schematic diagrams showing a pressure-sensitive adhesive layer according to one exemplary embodiment.
Figure 6:
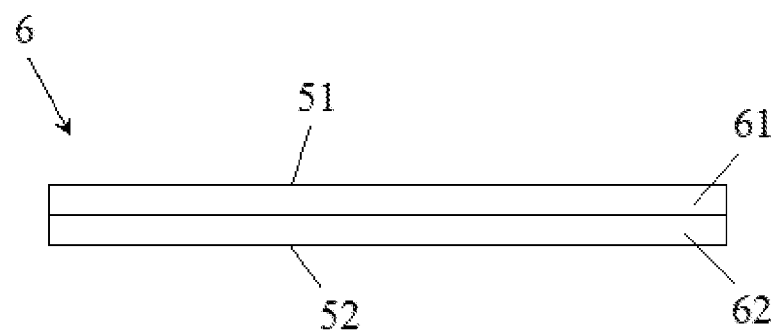
Figure 7:
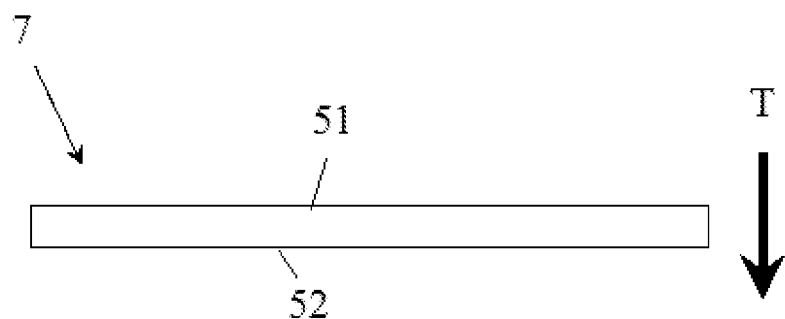
Figure 8:
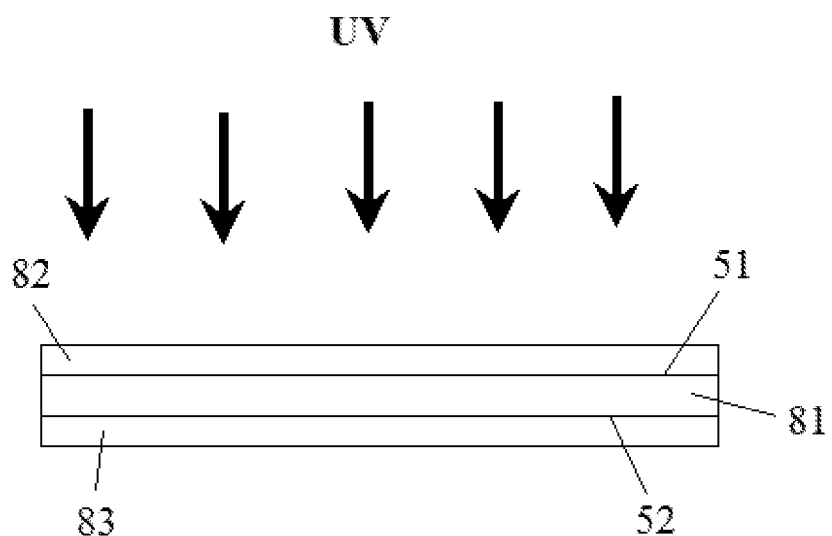
FIG. 8 is a schematic diagram showing a method of forming a pressure-sensitive adhesive layer according to one exemplary embodiment.

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

The physical properties of optical elements prepared in Examples and Comparative Examples were evaluated as follows.

1. Evaluation of Adhesive Strength

The optical elements prepared in Examples and Comparative Examples, in which a base layer, an alignment film, a liquid crystal layer, an adhesive layer and a polarizer were sequentially formed, were evaluated for adhesive strength by peeling the polarizer at a peel angle of 90° and a peel rate of 300 m/min to measure a peel strength of the polarizer to the base layer. A peel test was carried out by cutting a prepared optical element into pieces having a width of 20 mm and a length of 100 mm. The evaluation criteria were as follows.

<Evaluation Criteria>
O: A peel strength exceeds 1 N/cm.
X: A peel strength is 1 N/cm or less.

2. Measurement of Glass Transition Temperature of Adhesive Layer

A glass transition temperature of an adhesive layer was measured at a heating rate of 10° C./min using a differential scanning calorimeter (DSC). Here, the adhesive layer was prepared by coating a release-treated surface of a releasing PET sheet with the prepared adhesive composition so that a thickness after curing could amount to 10 nm, and contacting the release-treated surface of the releasing PET with an upper portion of the coating layer and then irradiating the coating layer with UV rays using a UV irradiation device (i.e., a metal halide lamp) (a UV A band, light intensity: 500 mJ/cm$^2$).

3. Evaluation of Thermal Shock Property

Each of the optical elements prepared in Examples and Comparative Examples was cut, and then attached to a glass substrate by means of a pressure-sensitive adhesive layer. Thereafter, one cycle of keeping each optical element at −40° C. for 1 hour and keeping the optical element at 80° C. for 1 hour was repeatedly performed 100 times. A change in appearance of the optical element was observed with the naked eye. In this case, the optical element was evaluated as "O" when there was no change in the appearance of the optical element, and evaluated as "X" when changes such as cracks were observed in the optical element.

4. Evaluation of Durability of Liquid Crystal Layer

The durability of a liquid crystal layer was evaluated by measuring a variation rate of a phase difference value caused after a durability test of the optical elements prepared in Examples and Comparative Examples. More particularly, an optical element was cut into pieces having a size of 10 cm×10 cm, and then attached to a glass substrate by means of a pressure-sensitive adhesive layer. And the optical element was then kept under a heat-resistant condition of 80° C. for 100 hours or 250 hours. Then, a decrement in phase difference values of the liquid crystal layer before and after being kept under the heat-resistant condition was converted into a percentage. The results are listed in the following Tables 4 and 5. As such, the phase difference value was measured at a wavelength of 550 nm according to the manufacturer's manual using Axoscan (commercially available from Axomatrix).

The durability evaluation criteria are as follows.

<Evaluation Criteria>

O: Variations in phase difference values of all the optical elements after being kept under a heat-resistant condition for 100 hours and 250 hours are less than 8%.

X: A variation in phase difference value of any one of the optical elements after being kept under a heat-resistant condition for 100 hours and 250 hours is 8% or more.

5. Crosstalk Evaluation

Figure 9:
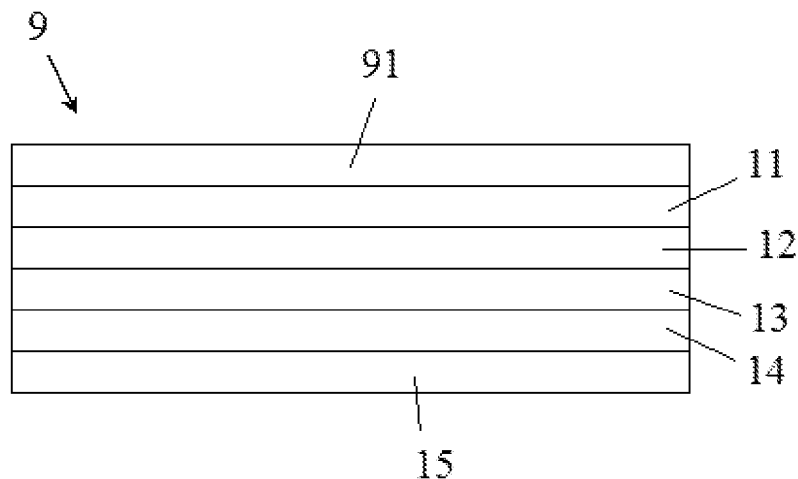
FIG. 9 is a schematic diagram showing an optical element according to one exemplary embodiment.
Figure 10:
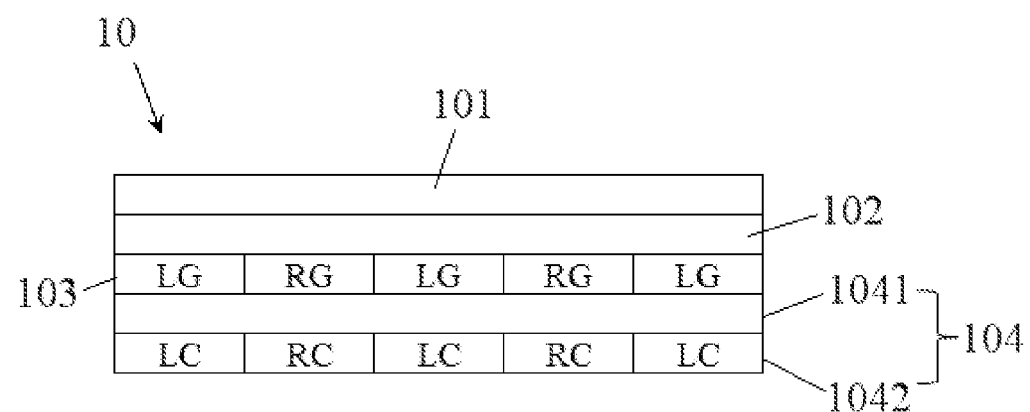
FIG. 10 is a schematic diagram showing a stereoscopic image display device according to one exemplary embodiment.
Figure 11:
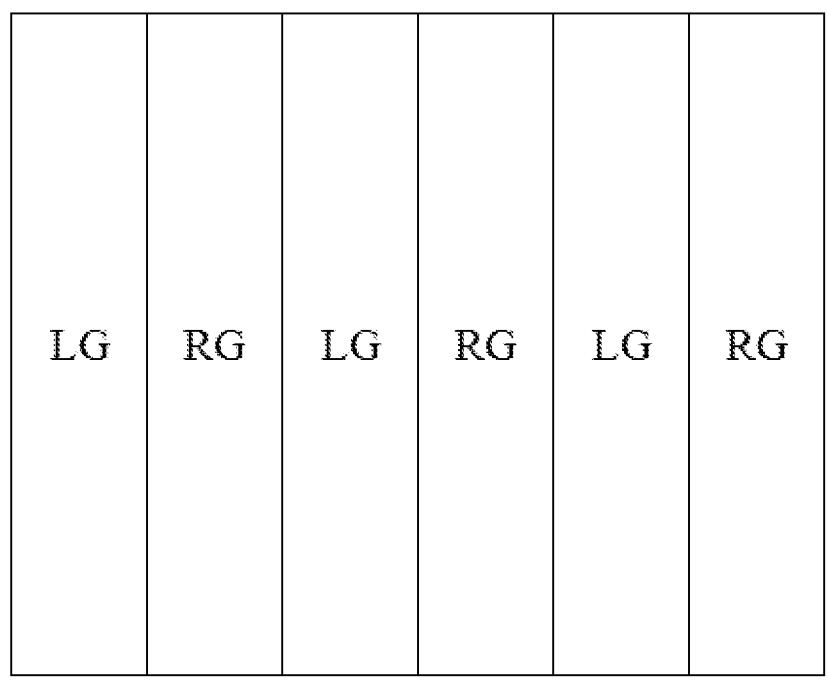

A crosstalk ratio may be defined as a ratio of brightness in a dark state and a bright state when a stereoscopic image is observed. In Examples and Comparative Examples, on the assumption that the optical element is applied to a stereoscopic image display device of a passive glasses type, a crosstalk ratio is measured using the following method. The optical element is used to constitute a stereoscopic image display device as shown in FIG. 9. Therefore, the polarized glasses for observing a stereoscopic image are disposed in a conventional observation point of the stereoscopic image display device. As such, when a stereoscopic image is observed by an observer, the conventional observation point refers to a point which is disposed away from the center of the stereoscopic image display device by a distance corresponding to 3/2 of a length in a horizontal direction of the stereoscopic image display device. At such a point, the polarized glasses are positioned on the assumption that the center of the display device is observed by an observer. As such, when it is assumed that the stereoscopic image is observed by the observer, the length in the horizontal direction of the stereoscopic image display device may be a length in a horizontal direction as viewed from the observer, for example, a width of the image display device. In such an arrangement, a luminometer (equipment name: SR-UL2 Spectrometer) is arranged in rear surfaces of lenses for the left and right eyes in the polarized glasses in a state where the stereoscopic image display device is allowed to output an L signal, and each of the lenses for the left and right eyes is measured for brightness. In this case, the brightness measured in the rear surface of the lens for the left eye is bright-state brightness, and the brightness measured in the rear surface of the lens for the right eye is dark-state brightness. After measurement of each brightness, a ratio of the bright-state brightness to the dark-state brightness ([dark-state brightness]/[bright-state brightness]) is converted into a percentage value (%), which may be defined as a crosstalk ratio (Y). Also, the crosstalk ratio may be measured in the same manner as described above, and the brightness in the bright and dark states may be measured in a state where a stereoscopic image display device outputs an R signal. In this case, the brightness measured in the rear surface of the lens for the left eye is dark-state brightness, and the brightness measured in the rear surface of the lens for the right eye is bright-state brightness. Similarly, a ratio of the dark-state brightness to the bright-state brightness is converted into a percentage value (%), which may be defined as a crosstalk ratio.

6. Evaluation of Phase Difference and Refractive Index

The phase difference and refractive index of an optical element or a liquid crystal layer were evaluated according to the manufacturer's manual using Axoscan (commercially available from Axomatrix).

7. Evaluation of Thickness and Width or Length of Optical Element

The width or length of an optical element was measured using 3-dimensional equipment, Premium 600C and IView Pro program (INTEK IMS Co., Ltd.). Also, the thickness measurement was performed using a spectral reflectometer, which is equipment that is able to evaluate characteristics of a thin film using interference between light reflected on a surface of the thin film and light reflected on an interface disposed under the thin film or phase difference of light.

Preparative Example 1

Preparation of Adhesive Composition (A)

25 parts by weight of an alicyclic epoxy compound (3,4-epoxycyclohexylmethyl-3,4'-epoxycyclohexanecarboxylate, celloxide C2021P commercially available from Dicel), 25 parts by weight of 1,4-cyclohexane dimethanol diglycidyl ether and 50 parts by weight of 3-ethyl-3[(3-ethyloxetane-3-yl)methoxymethyl]oxetane (ARON OXETANE DOX221 commercially available from Toagosei Co., Ltd) were blended to prepared a composition. Then, 5 parts by weight of a cationic initiator (diphenyl-(4-phenylthio)phenylsulfonium hexafluorophosphate, CPI100P commercially available from Sanapro) was further blended, relative to 100 parts by weight of the solid content of the composition, to prepare an adhesive composition (A)

Preparative Example 2

Preparation of Adhesive Composition (B)

25 parts by weight of an alicyclic epoxy compound (3,4-epoxycyclohexylmethyl-3,4'-epoxycyclohexanecarboxylate, celloxide C2021P commercially available from Dicel), 25 parts by weight of 1,4-cyclohexane dimethanol diglycidyl ether, 35 parts by weight of 3-ethyl-3[(3-ethyloxetane-3-yl)methoxymethyl]oxetane (ARON OXETANE DOX221 commercially available from Toagosei Co., Ltd) and 15 parts by weight of 3-ethyl-3-hydroxymethyloxetane (ARON OXETANE OXA commercially available from Toagosei Co., Ltd) were blended to prepare a composition. Then, 5 parts by weight of a cationic initiator (diphenyl-(4-phenylthio)phenylsulfonium hexafluorophosphate, CPI100P commercially available from Sanapro) was further blended, relative to 100 parts by weight of the solid content of the composition, to prepare an adhesive composition (B).

Preparative Example 3

Preparation of Adhesive Composition (C)

25 parts by weight of an alicyclic epoxy compound (3,4-epoxycyclohexylmethyl-3,4'-epoxycyclohexanecarboxylate, celloxide C2021P commercially available from Dicel), 25 parts by weight of 1,4-cyclohexane dimethanol diglycidyl ether, 45 parts by weight of 3-ethyl-3-[(3-ethyloxetane-3-yl) methoxymethyl]oxetane (ARON OXETANE DOX221 commercially available from Toagosei Co., Ltd) and 5 parts by weight of vinyltriethoxy silane were blended to prepare a composition. Then, 5 parts by weight of a cationic initiator (diphenyl-(4-phenylthio)phenylsulfonium hexafluorophosphate, CPI100P commercially available from Sanapro) was further blended, relative to 100 parts by weight of the solid content of the composition, to prepare an adhesive composition (C).

Preparative Example 4

Preparation of Adhesive Composition (D)

25 parts by weight of an alicyclic epoxy compound (3,4-epoxycyclohexylmethyl-3,4'-epoxycyclohexanecarboxylate, celloxide C2021P commercially available from Dicel), 25 parts by weight of 1,4-cyclohexane dimethanol diglycidyl ether, 45 parts by weight of 3-ethyl-3[(3-ethyloxetane-3-yl) methoxymethyl]oxetane (ARON OXETANE DOX221 commercially available from Toagosei Co., Ltd) and 10 parts by weight of vinyltriethoxy silane were blended to prepare a composition. Then, 5 parts by weight of a cationic initiator (diphenyl-(4-phenylthio)phenylsulfonium hexafluorophosphate, CPI100P commercially available from Sanapro) was further blended, relative to 100 parts by weight of the solid content of the composition, to prepare an adhesive composition (D).

Preparative Example 5

Preparation of Adhesive Composition (E)

25 parts by weight of an alicyclic epoxy compound (3,4-epoxycyclohexylmethyl-3,4'-epoxycyclohexanecarboxylate, celloxide C2021P commercially available from Dicel), 25 parts by weight of 1,4-cyclohexane dimethanol diglycidyl ether, 45 parts by weight of 3-ethyl-3-[(3-ethyloxetane-3-yl) methoxymethyl]oxetane (ARON OXETANE DOX221 commercially available from Toagosei Co., Ltd) and 10 parts by weight of vinylacetate were blended to prepare a composition. Then, 5 parts by weight of a cationic initiator (diphenyl-(4-phenylthio)phenylsulfonium hexafluorophosphate, CPI100P commercially available from Sanapro) was further blended, relative to 100 parts by weight of the solid content of the composition, to prepare an adhesive composition (E).

Preparative Example 6

Preparation of Adhesive Composition (F)

25 parts by weight of an alicyclic epoxy compound (3,4-epoxycyclohexylmethyl-3,4'-epoxycyclohexanecarboxylate, celloxide C2021P commercially available from Dicel), 25 parts by weight of 1,4-cyclohexane dimethanol diglycidyl ether, 30 parts by weight of 3-ethyl-3[(3-ethyloxetane-3-yl) methoxymethyl]oxetane (ARON OXETANE DOX221 commercially available from Toagosei Co., Ltd) and 20 parts by weight of vinyltriepoxysilane were blended to prepare a composition. Then, 5 parts by weight of a cationic initiator (diphenyl-(4-phenylthio)phenylsulfonium hexafluorophosphate, CPI100P commercially available from Sanapro) was further blended, relative to 100 parts by weight of the solid content of the composition, to prepare an adhesive composition (E)

Preparative Example 7

Preparation of Liquid Crystal Layer (A)

A composition for forming an optical alignment film was coated on one surface of a TAC base (refractive index: 1.49, thickness: 80,000 nm) so that a thickness after drying could amount to approximately 1,000 Å, and dried at 80° C. for 2 minutes in an oven. As the above-described composition for forming an optical alignment film, a composition prepared by mixing a mixture of an acryl monomer and polynorbornene (molecular weight $(_{Mw})$=150,000) having a cinnamate group of the following Formula 16 with a photoinitiator (Irgacure 907) and then dissolving the mixture in a toluene solvent so that a solid concentration of the polynorbornene could amount to 2% by weight (polynorbornene:acryl monomer:photoinitiator=2:1:0.25 (weight ratio)) was used.

Formula 16

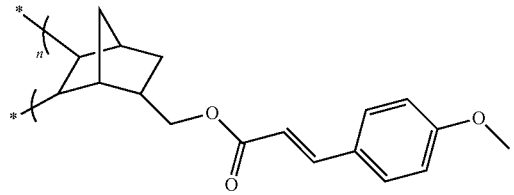

Next, the dried composition for forming an optical alignment film was aligned according to a method disclosed in Korean Patent Application No. 2010-0009723 to form an optical alignment film including first and second alignment regions which are aligned in different directions. More particularly, a pattern mask in which light-transmitting portions and light-intercepting portions in stripe shapes having widths of approximately 450 μm were alternately formed in a vertical direction and a horizontal direction was disposed on an upper portion of the dried composition, and a polarizing plate having two regions formed therein for transmitting two different kinds of polarized light was also disposed on an upper portion of the pattern mask. Then, the alignment treatment performed by irradiating the composition for forming an optical alignment film with UV rays (300 mW/cm$^2$) for approximately 30 seconds by means of the polarizing plate and the pattern mask while transferring the TAC base 30 having the optical alignment film formed thereon at a rate of approximately 3 m/min. Then, a liquid crystal layer was formed on the alignment layer undergoing the alignment treatment. More particularly, a liquid crystal composition including 70 parts by weight of a multifunctional polymerizable liquid crystal compound represented by the following Formula A, 30 parts by weight of a monofunctional polymerizable liquid crystal compound represented by the following Formula B, and a suitable amount of a photoinitiator was coated onto the optical alignment film to a dry thickness of approximately 1 nm, and the liquid crystal composition was aligned according to alignment of the alignment layer arranged under the liquid crystal layer. Then, a liquid crystal layer, which includes first and second regions having different optical axes perpendicular to each other according to the alignment of the optical alignment film arranged under the liquid crystal layer, was formed by cross-linking and polymerizing liquid crystals by irradiating the liquid crystals with UV rays (300 mW/cm$^2$) for approximately 10 seconds. In the liquid crystal layer, a difference between refractive indexes in a slow axis direction and fast axis direction was approximately 0.125.

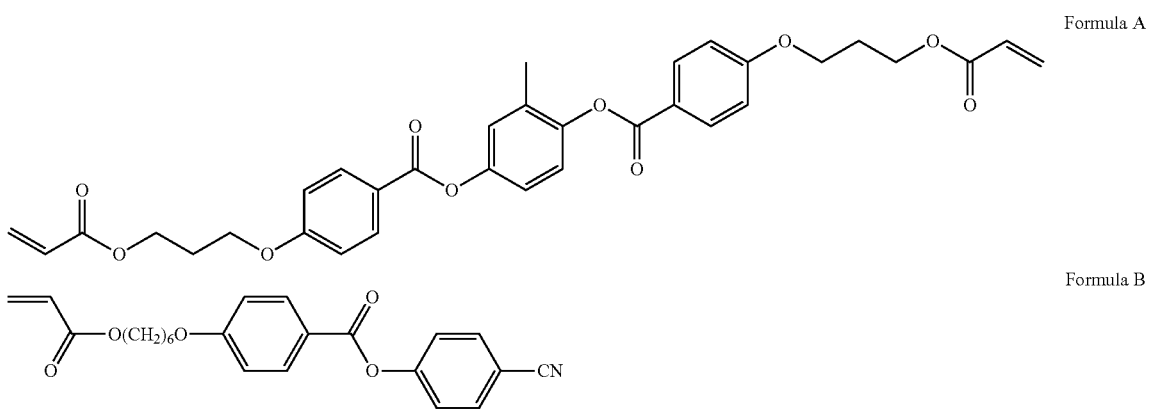

Formula A

Formula B

Preparative Examples 8 to 11

Preparation of Liquid Crystal Layer (B) to Liquid Crystal Layer (E)

Liquid crystal layers were prepared in the same manner as in Preparative Example 7, except that a weight ratio of a multifunctional polymerizable liquid crystal compound and a monofunctional polymerizable liquid crystal compound included in the liquid crystal composition was adjusted as listed in the following Table 1.

TABLE 1

|  | Liquid crystal layer (B) | Liquid crystal layer (C) | Liquid crystal layer (D) | Liquid crystal layer (E) |
|---|---|---|---|---|
| Multifunctional polymerizable liquid crystal compound (A) | 55 | 45 | 40 | 10 |
| Monofunctional polymerizable liquid crystal compound (B) | 45 | 55 | 60 | 90 |
| Refractive index difference | 0.125 | 0.125 | 0.125 | 0.125 |
| Thickness (μm) | 1 | 1 | 1 | 1 |

Content unit: parts by weight

Example 1

An optical element was manufactured as follows. First, in a structure prepared in Preparative Example 7, that is, a structure in which a TAC base, an alignment film and a liquid crystal layer (A) were sequentially formed, one surface of the liquid crystal layer was attached to the polyvinyl alcohol-based polarizer using the adhesive composition (A). More particularly, a surface of the liquid crystal layer was coated with the adhesive composition to a thickness after curing of 5 nm, and the polarizer was laminated on the liquid crystal layer. Also, a coating layer obtained by coating one surface of a releasing PET film with the adhesive composition (A) to a thickness after curing of 5 nm was laminated on the polarizer in a position opposite to the liquid crystal layer, and a surface of a releasing PET film was irradiated with UV rays (UV A band, 500 mJ/cm$^2$) to form an adhesive layer. Thereafter, the releasing PET film was removed, and a conventional optical acryl pressure-sensitive adhesive layer was formed on a surface of the adhesive layer to prepare an optical element.

Examples 2 to 6

Optical elements were manufactured in the same manner as in Example 1, except that liquid crystal layers, the kinds of adhesive compositions and the thickness of an adhesive layer to be formed were changed as listed in the following Table 2, and the UV irradiation conditions were adjusted to sufficiently cure the adhesive compositions.

TABLE 2

|  |  | Liquid crystal layers | Kinds of adhesive compositions (first and second adhesive layers) | Adhesive layer thickness (μm) (first and second adhesive layers) |
|---|---|---|---|---|
| Examples | 2 | Liquid crystal layer (A) | Adhesive composition (B) | 5 |
|  | 3 | Liquid crystal layer (A) | Adhesive composition (C) | 5 |
|  | 4 | Liquid crystal layer (A) | Adhesive composition (D) | 5 |
|  | 5 | Liquid crystal layer (A) | Adhesive composition (E) | 5 |
|  | 6 | Liquid crystal layer (B) | Adhesive composition (A) | 5 |

Comparative Examples 1 to 14

Optical elements were manufactured in the same manner as in Example 1, except that liquid crystal layers, the kinds of adhesive compositions and the thickness of an adhesive layer to be formed were changed as listed in the following Table 3, and the UV irradiation conditions were adjusted to sufficiently cure the adhesive compositions.

TABLE 3

|  |  | Liquid crystal layers | Kinds of adhesive compositions (first and second adhesive layers) | Adhesive layer thickness (μm) (first and second adhesive layers) |
|---|---|---|---|---|
| Comparative Examples | 1 | Liquid crystal layer (A) | Adhesive composition (F) | 5 |
|  | 2 | Liquid crystal layer (D) | Adhesive composition (A) | 5 |

TABLE 3-continued

| | Liquid crystal layers | Kinds of adhesive compositions (first and second adhesive layers) | Adhesive layer thickness (μm) (first and second adhesive layers) |
|---|---|---|---|
| 3 | Liquid crystal layer (D) | Adhesive composition (B) | 5 |
| 4 | Liquid crystal layer (D) | Adhesive composition (C) | 5 |
| 5 | Liquid crystal layer (D) | Adhesive composition (D) | 5 |
| 6 | Liquid crystal layer (D) | Adhesive composition (E) | 5 |
| 7 | Liquid crystal layer (D) | Adhesive composition (F) | 5 |
| 8 | Liquid crystal layer (E) | Adhesive composition (A) | 5 |
| 9 | Liquid crystal layer (E) | Adhesive composition (B) | 5 |
| 10 | Liquid crystal layer (E) | Adhesive composition (C) | 5 |
| 11 | Liquid crystal layer (E) | Adhesive composition (D) | 5 |
| 12 | Liquid crystal layer (E) | Adhesive composition (E) | 5 |
| 13 | Liquid crystal layer (E) | Adhesive composition (F) | 5 |
| 14 | Liquid crystal layer (C) | Adhesive composition (A) | 5 |

The optical elements prepared in Examples and Comparative Examples were evaluated for physical properties using the above-described method. The evaluation results are listed in the following Tables 4 and 5, respectively.

TABLE 4

| | | Glass transition temperatures of first adhesive layers (° C.) | Adhesive strength | Thermal shock property | Durability of liquid crystal layers | Initial phase difference (nm) | Changes in phase difference (after being kept for 100 hours) | |
|---|---|---|---|---|---|---|---|---|
| | | | | | | | Phase difference (nm) after being kept at heating conditions | Changes (%) |
| Examples | 1 | 120 | ○ | ○ | ○ | 125.4 | 119.7 | 4.5 |
| | 2 | 110 | ○ | ○ | ○ | 125.4 | 119.7 | 4.5 |
| | 3 | 100 | ○ | ○ | ○ | 125.4 | 119.7 | 4.5 |
| | 4 | 90 | ○ | ○ | ○ | 125.4 | 119.7 | 4.5 |
| | 5 | 120 | ○ | ○ | ○ | 125.4 | 119.7 | 4.5 |
| | 6 | 120 | ○ | ○ | ○ | 120.7 | 114.1 | 5.5 |

TABLE 5

| | | Glass transition temperatures of first adhesive layers (° C.) | Adhesive strength | Thermal shock property | Durability of liquid crystal layers | Initial phase difference (nm) | Changes in phase difference (after being kept for 100 hours) | |
|---|---|---|---|---|---|---|---|---|
| | | | | | | | Phase difference (nm) after being kept at heating conditions | Changes (%) |
| Comparative Example | 1 | 80 | X | X | ○ | 125.4 | 119.7 | 4.5 |
| | 2 | 120 | X | ○ | X | 77.2 | 69.4 | 10.1 |
| | 3 | 110 | X | ○ | X | 77.2 | 69.4 | 10.1 |
| | 4 | 100 | X | ○ | X | 77.2 | 69.4 | 10.1 |
| | 5 | 90 | X | ○ | X | 77.2 | 69.4 | 10.1 |
| | 6 | 120 | X | ○ | X | 77.2 | 69.4 | 10.1 |
| | 7 | 80 | X | X | X | 77.2 | 69.4 | 10.1 |
| | 8 | 120 | X | ○ | X | — | — | — |
| | 9 | 110 | X | ○ | X | — | — | — |
| | 10 | 100 | X | ○ | X | — | — | — |
| | 11 | 90 | X | ○ | X | — | — | — |
| | 12 | 120 | X | ○ | X | — | — | — |
| | 13 | 80 | X | X | X | — | — | — |
| | 14 | 120 | ○ | ○ | ○ | 94.1 | 85.5 | 9.1 |

—: A phase difference value cannot be measured since a liquid crystal layer is in a non-aligned state.

Experimental Example 1

Evaluation of Refractive Index Relationship of Liquid Crystal Layer and Light Division Property According to Thickness In order to evaluate the refractive index relationship of a liquid crystal layer and a light division property of the liquid crystal layer according to a thickness, a sample was prepared, as will be described later. More particularly, a phase retardation layer was formed in the same manner as in Preparative Example 7, wherein the phase retardation layer was prepared by forming liquid crystal layers having thicknesses of approximately 0.3 μm, 1 μm and 2.5 μm, respectively, by adjusting compositions of a liquid crystal mixture so that a difference between refractive indexes in a slow axis direction and a fast axis direction could amount to 0.03 after forming of the liquid crystal layer. Also, a phase retardation layer was prepared in the same manner using the same liquid crystal compound as in Preparative Example 7, wherein the phase retardation layer was prepared by forming liquid crystal layers having thicknesses of approximately 0.3 μm and 2.5 μm. Also, a phase retardation layer was formed in the same manner as in Preparative Example 7, wherein the phase retardation layer was prepared by forming liquid crystal layers having thicknesses of approximately 0.3 μm, 1 μm and 2.5 μm, respectively, by adjusting compositions of a liquid crystal mixture so that a difference between refractive indexes in a slow axis direction and a fast axis direction could amount to 0.22 after forming of the liquid crystal layer. Thereafter, an optical element was prepared in the same manner as in Example 1 using the prepared phase retardation layer, and crosstalk ratios obtained when the prepared optical element and the optical element of Example 1 were used to observe a stereoscopic image were evaluated. The results are listed in the following Table 6.

TABLE 6

Liquid crystal layers of phase retardation layers

| Refractive index difference* | Thickness (μm) | Crosstalk ratio (%) |
|---|---|---|
| 0.03 | 0.3 | 79.5 |
| 0.03 | 1 | 45.3 |
| 0.03 | 2.5 | 10.3 |
| 0.125 | 0.3 | 36 |
| 0.125 | 1 | 0.5 |
| 0.125 | 2.5 | 177.4 |
| 0.22 | 0.3 | 14.6 |
| 0.22 | 1 | 30.7 |
| 0.22 | 2.5 | 121.6 |

*Refractive index difference represents a difference between in-plane refractive indexes of a liquid crystal layer in a slow axis direction and fast axis direction.

The optical element according to one exemplary embodiment of the present invention may be a light-dividing element, for example an element that can divide incident light into at least two kinds of light having different polarized states. For example, the optical element can be used to realize a stereoscopic image.

While the invention has been shown and described with reference to certain exemplary embodiments thereof, it will be understood by those skilled in the art that various changes in form and details may be made therein without departing from the scope of the invention as defined by the appended claims.

What is claimed is:

1. An optical element comprising:
 a liquid crystal layer having a difference between in-plane refractive index in a slow axis direction and in-plane refractive index in a fast axis direction of 0.05 to 0.2 and a thickness of 0.5 μm to 2.0 μm, and satisfies the following Equation 1;
 a first adhesive layer attached to one surface of the liquid crystal layer and having a glass transition temperature of 85° C. or higher;
 a polarizer attached to one surface of the first adhesive layer;
 a second adhesive layer attached to one surface of the polarizer; and
 a pressure-sensitive adhesive layer attached to one surface of the second adhesive layer:

$$X < 8\% \qquad \text{Equation 1}$$

wherein X represents a percentage of a variation in a phase difference value of the liquid crystal layer obtained after keeping the optical element at 80° C. for 100 hours, relative to the initial phase difference value of the liquid crystal layer of the optical element.

2. The optical element of claim 1, wherein the liquid crystal layer comprises a multifunctional polymerizable liquid crystal compound and a monofunctional polymerizable liquid crystal compound in polymerized forms.

3. The optical element of claim 2, wherein the polymerizable liquid crystal compound is a compound represented by the following Formula 1:

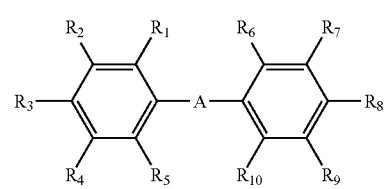

Formula 1 wherein A is a single bond, —COO— or —OCO—, and $R_1$ to $R_{10}$ are independently hydrogen, a halogen, an alkyl group, an alkoxy group, an alkoxycarbonyl group, a cyano group, a nitro group, —O-Q-P or a substituent of the following Formula 2, respectively, provided that at least one of the substituents $R_1$ to $R_{10}$ is —O-Q-P or a substituent of the following Formula 2, or two adjacent substituents of $R_1$ to $R_5$ or two adjacent substituents of $R_6$ to $R_{10}$ are joined together to form a benzene ring substituted with —O-Q-P, wherein Q is an alkylene group or an alkylidene group, and P is an alkenyl group, an epoxy group, a cyano group, a carboxyl group, an acryloyl group, a methacryloyl group, an acryloyloxy group or a methacryloyloxy group,

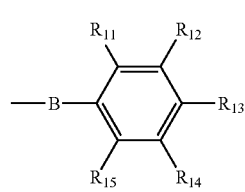

Formula 2 wherein the "—" on the left side of B means that B directly bonds to the benzene ring of Formula 1, B is a single bond, —COO— or —OCO—, and $R_{11}$ to $R_{15}$ are independently hydrogen, a halogen, an alkyl group, an alkoxy group, an alkoxycarbonyl group, a cyano group, a nitro group or —O-Q-P, respectively, provided that at least one of substituents $R_{11}$ to $R_{15}$ is —O-Q-P, or two adjacent substituents of $R_{11}$ to $R_{15}$ are joined together to form a benzene ring substituted with —O-Q-P, wherein Q is an alkylene group or an alkylidene group, and P is a an alkenyl group, an epoxy group, a cyano group, a carboxyl group, an acryloyl group, a methacryloyl group, an acryloyloxy group or a methacryloyloxy group.

4. The optical element of claim 2, wherein the monofunctional polymerizable liquid crystal compound is comprised in the liquid crystal layer in an amount of greater than 0 parts by weight and 100 parts by weight or less, relative to 100 parts by weight of the multifunctional polymerizable liquid crystal compound.

5. The optical element of claim 1, wherein the liquid crystal layer comprises first region and second region having different phase retardation properties.

6. The optical element of claim 5, wherein the first region and second region have optical axes formed in different directions.

7. The optical element of claim 6, wherein a line bisecting an angle formed by the optical axes of the first region and the optical axes of the second region is formed vertically or horizontally with respect to the absorption axis of the polarizer.

8. The optical element of claim 1, wherein the adhesive layer has a glass transition temperature of 87° C. or higher.

9. The optical element of claim 1, wherein the adhesive layer has a thickness of 6 μm or less.

10. The optical element of claim 1, wherein the first adhesive layer comprises an active energy ray-curable adhesive composition including a cationically polymerizable compound in a cured state.

11. The optical element of claim 10, wherein the cationically polymerizable compound is at least one epoxy compound selected from the group consisting of an alicyclic epoxy compound, an aromatic epoxy compound and an aliphatic epoxy compound.

12. The optical element of claim 11, wherein the alicyclic epoxy compound is an epoxycyclohexylmethyl epoxycyclohexanecarboxylate-based compound; an epoxycyclohexane carboxylate-based compound of alkanediol; an epoxy cyclohexylmethyl ester-based compound of dicarboxylic acid; an epoxycyclohexylmethyl ether-based compound of polyethylene glycol; an epoxycyclohexylmethyl ether-based compound of alkanediol; a diepoxytrispiro-based compound; a diepoxymonospiro-based compound; a vinylcyclohexene diepoxide compound; an epoxycyclopentyl ether compound or a diepoxy tricyclo decane compound.

13. The optical element of claim 11, wherein the aromatic epoxy compound is a bisphenol-type epoxy resin; a novolac-type epoxy resin; a cresol epoxy resin or a resorcinol glycidyl ether.

14. The optical element of claim 11, wherein the aliphatic epoxy compound is a polyglycidyl ether of aliphatic polyvalent alcohol; a polyglycidyl ether of an alkyleneoxide addition product of aliphatic polyvalent alcohol; a polyglycidyl ether of polyester polyol of aliphatic polyvalent alcohol and aliphatic polyvalent carboxylic acid; a polyglycidyl ether of aliphatic polyvalent carboxylic acid; a polyglycidyl ether of polyester polycarboxylic acid of aliphatic polyvalent alcohol and aliphatic polyvalent carboxylic acid; a dimer, oligomer or polymer obtained by vinyl polymerization of glycidyl acrylate or glycidyl methacrylate; or an oligomer or polymer obtained by vinyl polymerization of glycidyl acrylate or glycidyl methacrylate with vinyl monomer other than the glycidyl acrylate and glycidyl methacrylate.

15. The optical element of claim 10, wherein the adhesive composition further comprises a compound represented by the following Formula 13:

$$Si(R_1)_n(R_2)_{4-n} \qquad \text{Formula 13}$$

wherein $R_1$ is a functional group including a vinyl group, a cyclic ether group or a vinyloxy group which is bonded to a silicon atom, $R_2$ is hydrogen, a hydroxyl group, an alkyl group or an alkoxy group which is bonded to a silicon atom, and n is an integer ranging from 1 to 4.

16. The optical element of claim 10, wherein the adhesive composition further comprises a cationic initiator.

17. The optical element of claim 10, wherein the adhesive composition further comprises an oxetane compound.

18. The optical element of claim 1, wherein the pressure-sensitive adhesive layer has a first main surface and a second main surface, the first main surface is attached to the polarizer, and the first main surface and second main surface have different tensile modulus, or different peel strengths with respect to an alkali-free glass.

19. The optical element of claim 18, wherein the first main surface has a higher tensile modulus than the second main surface, or the first main surface has a lower peel strength than the second main surface with respect to the alkali-free glass.

20. A stereoscopic image display device comprising the optical element defined in claim 1.

21. The stereoscopic image display device of claim 20, further comprising a display element configured to generate image signals for left and right eyes,
wherein a liquid crystal layer of the optical element comprises first region and second region having different phase retardation properties, and
the optical element is arranged so that the image signal for the left eye can pass through one of the first region and second region and the image signal for the right eye can pass through the other region.

* * * * *